(12) United States Patent
Tsuzuki

(10) Patent No.: US 7,619,766 B2
(45) Date of Patent: Nov. 17, 2009

(54) IMAGE FORMING DEVICE

(75) Inventor: Hiroyuki Tsuzuki, Tokyo (JP)

(73) Assignee: Oki Data Corporation, Tokyo (JP)

(*) Notice: Subject to any disclaimer, the term of this patent is extended or adjusted under 35 U.S.C. 154(b) by 854 days.

(21) Appl. No.: 11/137,509

(22) Filed: May 26, 2005

(65) Prior Publication Data

US 2005/0264846 A1    Dec. 1, 2005

(30) Foreign Application Priority Data

May 28, 2004  (JP)  .............................. 2004-159021

(51) Int. Cl.
*G06F 15/00* (2006.01)
*G06F 15/16* (2006.01)
(52) U.S. Cl. ..................................... 358/1.15; 709/206
(58) Field of Classification Search ................ 358/1.15, 358/1.13, 1.14, 1.18, 400, 402, 468, 1.16; 709/203, 206, 213, 219, 218, 223; 713/169, 713/170, 164, 182, 171; 340/5.61, 10.42, 340/508.1; 707/3, 104.1; 283/85
See application file for complete search history.

(56) References Cited

U.S. PATENT DOCUMENTS

| 5,959,530 A | * | 9/1999 | Lupien et al. | ............ 340/568.1 |
| 2004/0196485 A1 | * | 10/2004 | Hikichi et al. | ............ 358/1.13 |
| 2008/0005781 A1 | * | 1/2008 | Koga | ............................ 726/2 |

* cited by examiner

*Primary Examiner*—Saeid Ebrahimi Dehkordy
(74) *Attorney, Agent, or Firm*—Kubotera & Associates, LLC

(57) ABSTRACT

An image forming device includes a data receiving unit for receiving printing data and first identification information through a network; a data storage unit for storing the printing data and the first identification information; a non-contact medium information obtaining unit for obtaining second identification information stored in a memory of a non-contact medium; a print control unit for controlling a printing process of forming an image according to the printing data; a information comparison unit for comparing the first identification information with the second identification information; and a data control unit for retrieving the printing data corresponding to the first identification information from the data storage unit and sending the printing data to the print control unit when the information comparison unit determines that the first identification information matches to the second identification information.

20 Claims, 21 Drawing Sheets

| STATUS | INDIVIDUAL IDENTIFICATION INFORMATION (EMPLOYEE NUMBER) |
|---|---|
| 01: CARD RECOGNITION | 1001 |
| 02: OUT OF RECOGNITION AREA | |

| STATUS | INDIVIDUAL IDENTIFICATION INFORMATION (EMPLOYEE NUMBER) | JOB NAME |
|---|---|---|
| 01: RESPONSE REQUEST | 1001 | JobName1 |
| 02: NON-RESPONSE REQUEST | – | – |

| STATUS | INDIVIDUAL IDENTIFICATION INFORMATION (EMPLOYEE NUMBER) |
|---|---|
| 01: AUTHENTICATION PERMITTED | 1001 |

IMAGE FORMING DEVICE

BACKGROUND OF THE INVENTION

The present invention relates to an image forming device such as a printer, a facsimile, or a copier. In particular, the present invention relates to an image forming device for printing an authenticated document such as a confidential document.

An image forming device may print a confidential document through an authentication process, so that a person other than authorized people cannot see the document. For example, Japanese Patent Publication (Kokai) No. 11-249848 has disclosed such an image forming device. In the authentication process, for example, a password is input through an operation panel of a printer before printing. When a person needs to print a confidential document, the authentication process is selected from printing modes on a host computer. After the host computer communicates (negotiates) with the printer, printing data sent from the host computer is temporarily stored in the printer. The person comes to the printer at an earliest convenient time, and inputs a user ID and a password through an operation panel of the printer. When the password is matched, a list of printing data is displayed for the person. Desired printing data is selected from the printing data list, thereby printing the printing data stored in the printer.

Patent Reference: Japanese Patent Publication (Kokai) No. 11-249848

In the authentication printing process disclosed in Japanese Patent Publication (Kokai) No. 11-249848, it is necessary to input a password through the operation panel. Further, it takes long time to print a document from inputting a password, starting up the authentication printing, and warming up the printer, thereby wasting time.

In view of the problems described above, an object of the present invention is to provide an image forming device capable of the authentication printing without the process of inputting a password or a user ID.

Further objects and advantages of the invention will be apparent from the following description of the invention.

SUMMARY OF THE INVENTION

In order to attain the objects described above, according to a first aspect of the present invention, an image forming device comprises a data receiving unit for receiving printing data and first identification information through a network; a data storage unit for storing the printing data and the first identification information such that the printing data correspond to the first identification information; a non-contact medium information obtaining unit for obtaining second identification information stored in a memory of a non-contact medium; a print control unit for controlling a printing process of forming an image according to the printing data; a information comparison unit for comparing the first identification information stored in the data storage unit with the second identification information obtained by the non-contact medium information obtaining unit; and a data control unit for retrieving the printing data corresponding to the first identification information from the data storage unit and sending the printing data to the print control unit when the information comparison unit determines that the first identification information matches to the second identification information.

According to the present invention, the data received by the data receiving unit includes authentication printing data.

According to the present invention, the image forming device further comprises an authentication determination unit for determining that the data receiving unit receives the authentication printing data. When it is determined that the data receiving unit receives the authentication printing data, the authentication determination unit stores the authentication printing data in the data storage unit.

According to the present invention, the non-contact medium information obtaining unit stores the second identification information just obtained in the data storage unit. The non-contact medium information obtaining unit includes a judging unit for judging that the second identification information just obtained is equivalent to the second identification information previously stored in the data storage unit. The non-contact medium information obtaining unit stores the second identification information just obtained in the data storage unit as new second identification information when the judging unit judges that the second identification information just obtained is not equivalent to the second identification information previously stored in the data storage unit.

According to the present invention, when the non-contact medium information obtaining unit stores the second identification information, the non-contact medium information obtaining unit notifies the data control unit that the non-contact medium information obtaining unit stores the second identification information.

According to the present invention, the image forming device further comprises a display unit for displaying an authentication printing start confirmation message when the authentication determination unit requests the display unit to display the authentication printing start confirmation message, and an operation panel control unit having an input unit for requesting authentication printing to start.

According to the present invention, the authentication determination unit determines that the printing data is the authentication printing data when the authentication determination unit detects an authentication printing selection command.

According to the present invention, the data control unit controls the operation panel control unit to display the authentication printing start confirmation messages corresponding to a plurality of the second identification information when the non-contact medium information obtaining unit obtains the plurality of the second identification information. The operation panel control unit alternately displays the authentication printing start confirmation messages upon receiving a request signal.

According to the present invention, the data receiving unit receives an employee number as the first identification information. The non-contact medium information obtaining unit obtains an employee number as the second identification information.

According to the present invention, the data storage unit stores the printing data and the first identification information separately.

According to the present invention, the non-contact medium information obtaining unit obtains the second identification information stored in a memory of a radio frequency identification (RFID) card as the non-contact medium.

According to the present invention, the non-contact medium information obtaining unit includes a card communication unit capable of communicating with the RFID card.

According to the present invention, an image forming device comprises a data receiving unit for receiving printing data and first identification information through a network; a data storage unit for storing the printing data and the first identification information such that the printing data correspond to the first identification information; a non-contact medium information obtaining unit for obtaining second identification information stored in a memory of a non-contact medium; a print control unit for controlling a printing process of forming an image according to the printing data; a print preparation unit for performing a print preparation process upon receiving an operation signal from the print control unit; a information comparison unit for comparing the first identification information stored in the data storage unit with the second identification information obtained by the non-contact medium information obtaining unit; and a data control unit for sending a command signal to the print control unit to activate the print preparation unit when the information comparison unit determines that the first identification information matches to the second identification information.

According to the present invention, the print preparation unit includes a warm-up operation unit for warming up a fuser unit.

In the present invention, a user carries a non-contact type IC card storing individual information such as an employee number as the second identification information. When the non-contact type IC card comes closer to an IC card recognizing unit (the non-contact medium information obtaining unit) of a printer, it is possible to identify an individual and start the authentication printing. Accordingly, it is possible to eliminate a process of inputting a user ID or a password for the authentication printing necessary for a conventional printer. When the non-contact type IC card comes closer, the print control unit controls according to a detection signal, and the print preparation unit starts preparation such as warming up a fuser unit upon receiving the operation signal from the print control unit. Accordingly, the printer starts the warm-up not when a button on the operation panel is pushed, but when the user approaches the printer within a specific distance. As a result, it is possible to shorten warm-up time for printing and operation time up to completion of the printing, thereby saving time.

BRIEF DESCRIPTION OF THE DRAWINGS

FIG. 12 is a schematic view showing an example of an IC card recognition message according to the first embodiment of the present invention;

FIG. 13 is a schematic view showing an example of a panel response request message according to the first embodiment of the present invention;

FIG. 14 is a schematic view showing an example of an authentication printing acceptance message according to the first embodiment of the present invention;

DESCRIPTION OF THE PREFERRED EMBODIMENTS

Hereunder, embodiments of the present invention will be explained with reference to the accompanying drawings.

First Embodiment

Figure 1:
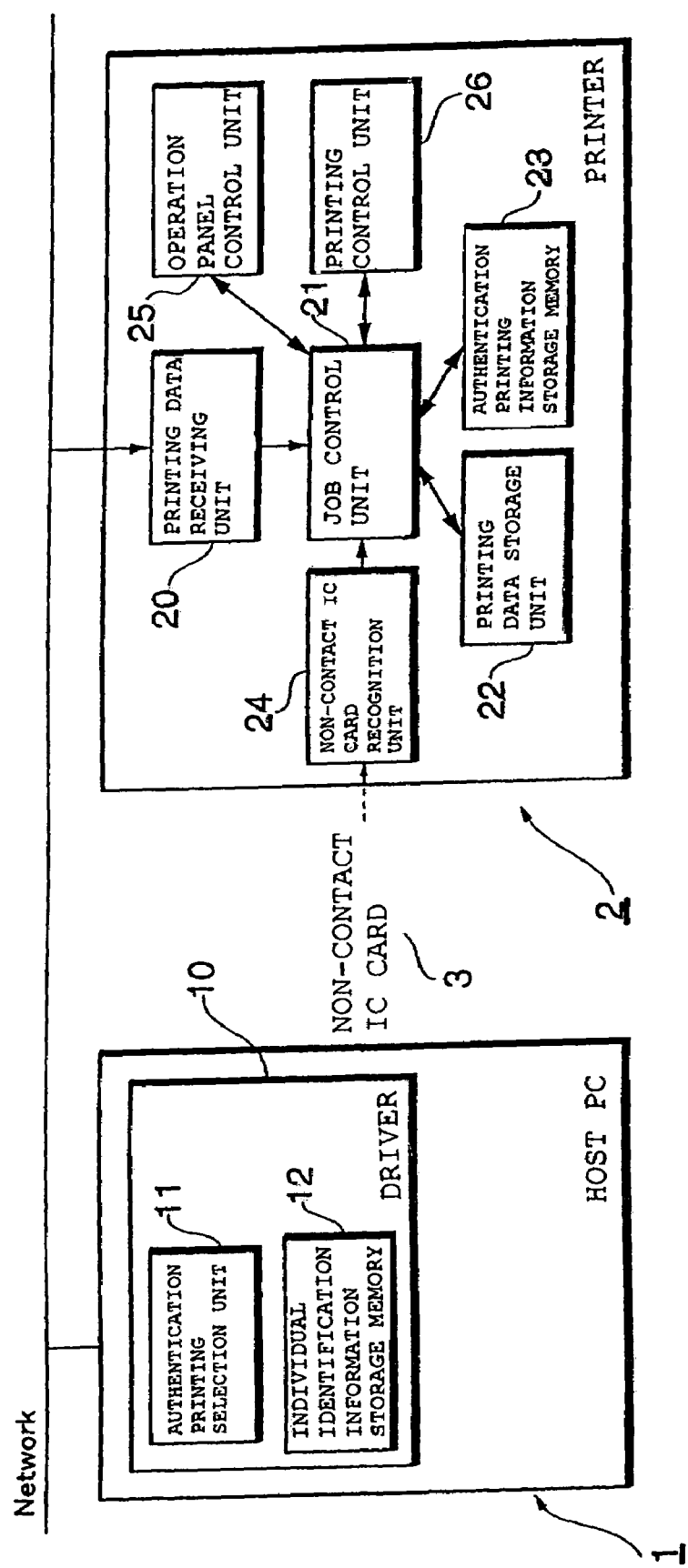
FIG. 1 is a block diagram showing an image forming device according to a first embodiment of the present invention.

In FIG. 1, when a user performs authentication printing, the user brings a non-contact ID card 3 such as a radio frequency identification (RFID) card close to a non-contact IC card recognition unit 24 of a printer 2, or the user carrying the non-contact ID card 3 approaches the printer 2 within a specific distance. The non-contact ID card 3 stores individual identification information such as an employee number as second identification information. The printer 2 detects the non-contact IC card 3 and communicates with the same for obtaining the individual identification information stored in the non-contact IC card 3.

A job control unit 21 in the printer 2 compares the second identification information obtained from the non-contact ID card 3 with first identification information in an authentication printing information storage unit 23. When the job control unit 21 determines that the second identification information matches to the first identification information, the job control unit 21 retrieves printing data corresponding to the first identification information, and sends the printing data to a print control unit 26. At the same time, the job control unit 21 sends a print preparation command signal to the print control unit 26, so that a print preparation unit is started. The print preparation unit performs, for example, a warm-up process of warming up a fuser unit.

Configuration of the First Embodiment

In FIG. 1, a host PC 1 sends authentication printing data to the printer 2 for printing. The host PC 1 has a function of a printer driver 10, and receives a printing command from a periphery device (application) running on the host PC 1 to generate printing data for the printer 2 to perform authentication printing.

The driver 10 includes an authentication printing selection unit 11 and an individual identification information storage memory 12. The authentication printing selection unit 11 includes a selection unit for selecting the authentication printing through a display of the driver 10, and an input unit for inputting a job name to specify printing data upon the authentication printing. The individual identification information storage memory 12 is a memory area for storing information such as an employee number for identifying an individual. The information corresponds to second identification information stored in the non-contact IC card 3.

Figure 3:
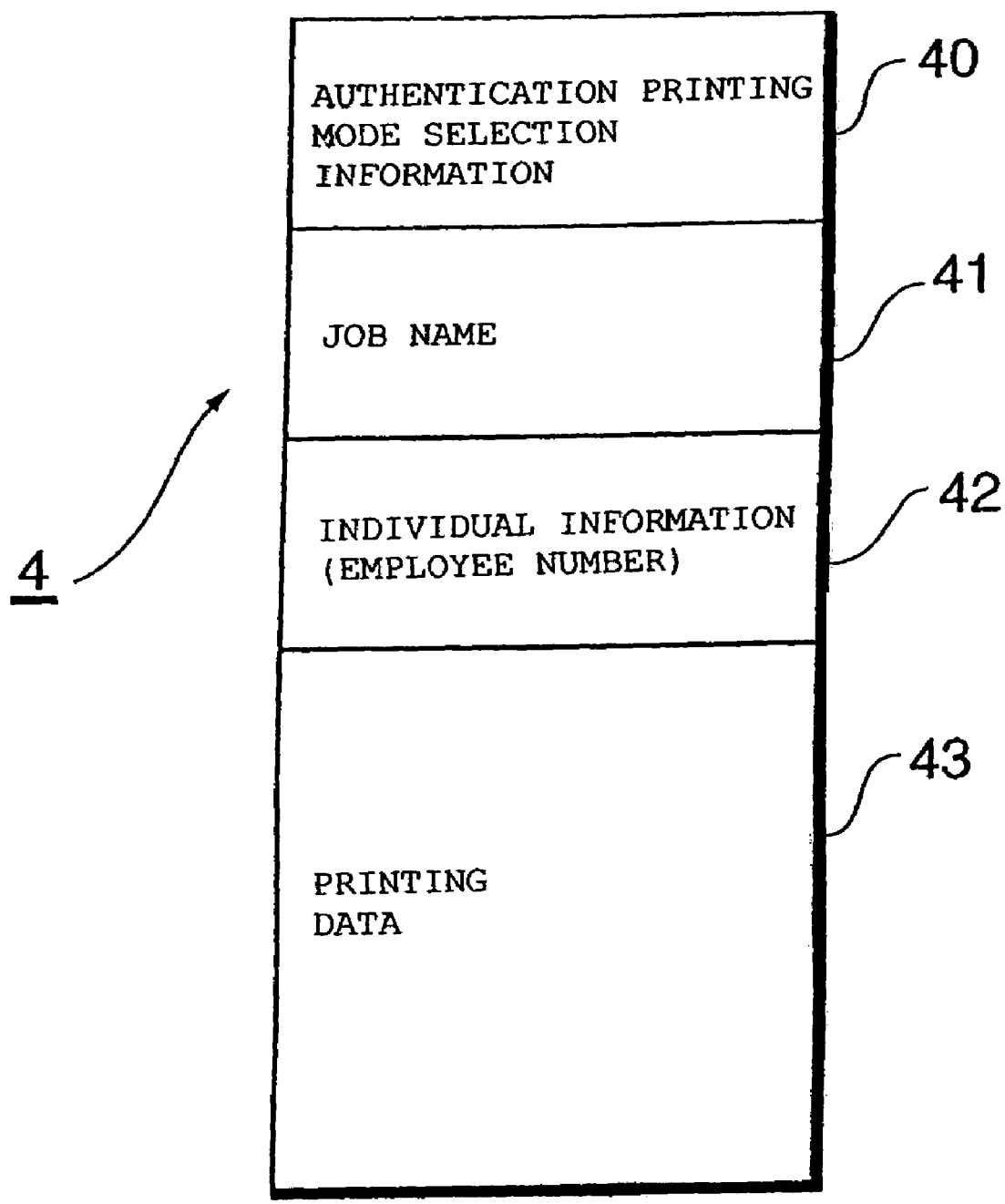
FIG. 3 is a schematic view showing a format of authentication printing data according to the first embodiment of the present invention.

In FIG. 3, the authentication printing data 4 has authentication printing mode selection information 40 as a data area for storing a specific text indicating that the printing data is the authentication printing. The authentication printing data 4 also has a job name 41 as a data area for storing a text indicating a job for identifying the authentication printing data 4. In the authentication printing, the text stored in the job name 41 is displayed on an operation panel of the printer 2. The authentication printing data 4 also has individual identification information 42 as a data area for storing information capable of identifying a user who sends the authentication printing data 4. Printing data 43 is a data area for storing printing command data.

As shown in FIG. 1, the printer 2 is formed of the following components: a printing data receiving unit 20 (data receiving unit); a job control unit 21 (data control unit) for analyzing the printing data to determine that the authentication printing is selected; a printing data storage unit 22 (data storage unit) as a storage area (for example, hard drive; HDD) for temporarily storing the printing data for the authentication printing; and an authentication printing information storage memory 23 as a storage area for storing the authentication printing information for comparison for the authentication printing of the printing data stored in the printing data storage unit 22, and for storing information indicating a storage location (file name in HDD) upon storing in the printing data storage unit 22.

Further, the printer 2 includes a non-contact IC card recognition unit 24 (non-contact medium information obtaining unit) functioning as a non-contact IC card reader and controlling the non-contact IC card reader for recognizing an IC card and reading information in the IC card when the IC card gets close to the printer 2. The printer 2 also has an operation panel control unit 25 for recognizing that a user pushes a button for permission of the authentication printing and displaying a prompt of the authentication printing.

The printer 2 further includes a print control unit 26 for analyzing a command and generating an image for printing upon receiving the printing data from the job control unit 21. The print control unit 26 also operates a printing unit in the printer 2 to perform an actual printing. The print control unit 26 sends an operation signal to the print preparation unit in the printer 2 upon receiving a print preparation command from the job control unit 21, so that the print preparation unit starts increasing a temperature of a fuser unit.

Figure 4:
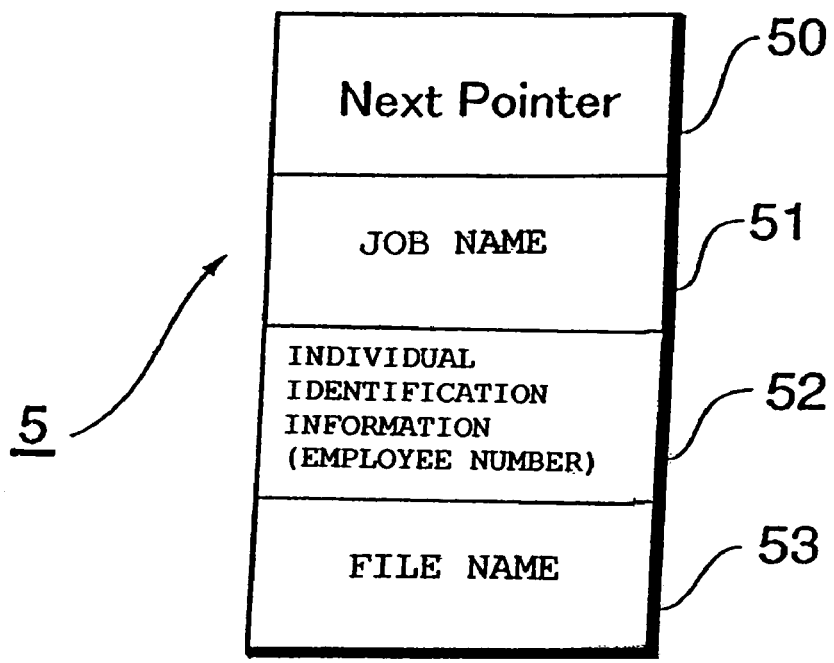
FIG. 4 is a schematic view showing a format of authentication printing information according to the first embodiment of the present invention.

FIG. 4 is a schematic view showing a format of authentication printing information 5 registered in the authentication printing information storage memory 23 of the printer 2. The authentication printing information 5 includes Next Pointer 50 as a pointer for tracing next authentication printing information when a plurality of authentication printing information is registered. Job name 51 and individual identification information 52 are areas for storing data equivalent to the job name 41 and the individual identification information 42 in the authentication printing data 4, respectively. A file name 53 indicates a storage location of the printing data 42 in the printing data storage unit 22 of the printer 2.

Figure 2:
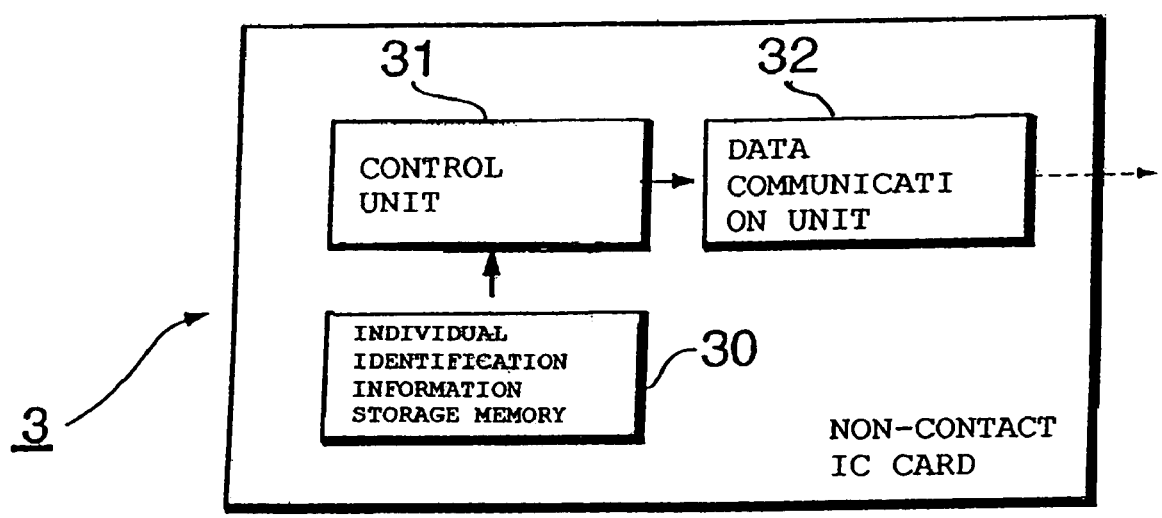
FIG. 2 is a schematic block diagram showing a non-contact IC card according to the first embodiment of the present invention.

FIG. 2 is a schematic block diagram showing the non-contact IC card 3 to be used as the non-contact medium in the present invention. A user of the host PC 1 carries the non-contact IC card 3 as an employee identification card or a user card. An IC card administer stores in advance the second individual identification information of the present invention such as an employee number for identifying an individual in an individual identification information storage memory 30. The first individual identification information of the present invention is stored in the individual identification information storage memory 12 in the driver 10 of the host PC 1 in advance with a specific method.

The non-contact IC card 3 includes the individual identification information storage memory 30, a control unit 31, and a data communication unit 32. The individual identification information storage memory 30 is a storage area for storing individual identification information for identifying an owner of the IC card 3, and information regarding a type of card. The control unit 31 receives and recognizes a information request command sent from the non-contact IC card recognition unit 24 in the printer 2 through a non-contact way. Further, the control unit 31 sends the individual identification information stored in the individual identification information storage memory 30 to the non-contact IC card recognition unit 24 through the data communication unit 32 through a non-contact way. The communication unit 32 communicates data with the non-contact IC card recognition unit 24 in the printer 2 through an antenna unit provided in the communication unit 32 through a non-contact way.

Figure 5:
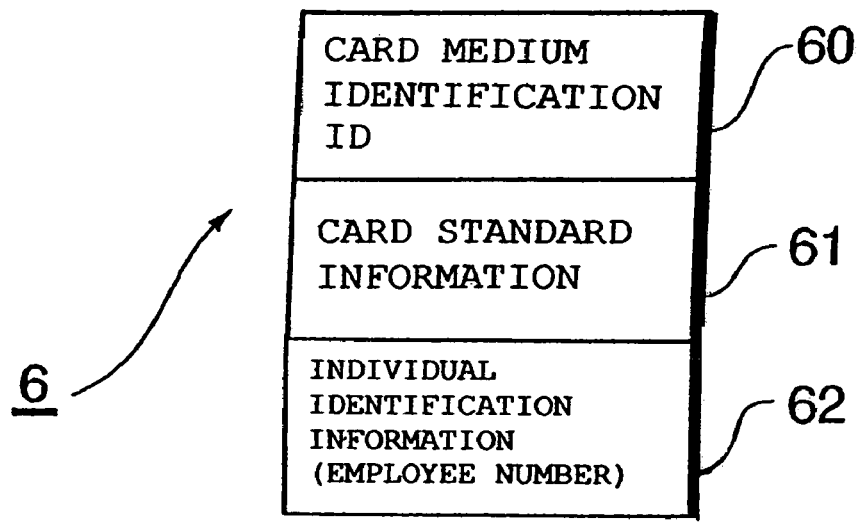
FIG. 5 is a schematic view showing a format of individual identification information in the non-contact IC card according to the first embodiment of the present invention.

FIG. 5 is a schematic view showing a format of non-contact IC card individual identification information 6 stored in the individual identification information storage memory 30 in the non-contact IC card 3. The format of the non-contact IC card individual identification information 6 includes a card medium identification ID 60, card standard information 61, and individual identification information 62 such as an employee number. The card medium identification ID 60 is a storage area for storing address information to specify a communication target when the non-contact IC card 3 communicates with the card reader. The card standard information 61 is a storage area for storing information indicating that the non-contact IC card 3 can be used in the printer 2, for example, information regarding a manufacturer of the printer 2. The individual identification information 62 is a storage area for storing individual information such as an employee number to identify the owner of the non-contact IC card 3.

Figure 15:
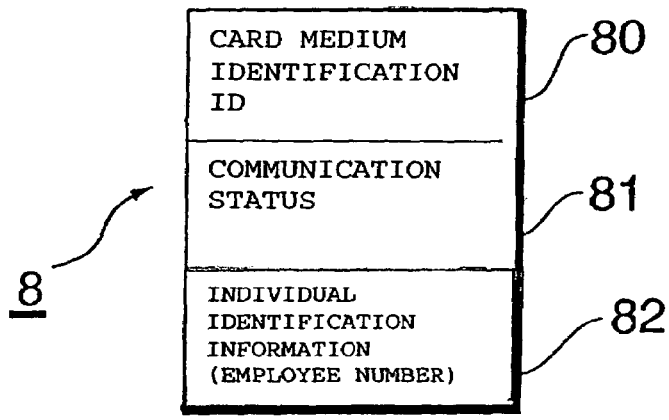
FIG. 15 is a schematic view showing a format of IC card communication handler information according to the first embodiment of the present invention.

FIG. 15 is a schematic view showing a format of IC card communication handler information 8. The non-contact IC card recognition unit 24 in the printer 2 generates the IC card communication handler information 8 in a memory area for identifying the non-contact IC card 3 or for storing a state of data communication. The format of the IC card communication handler information 8 includes a storage area formed of a card medium identification ID 80, a communication status 81, and individual identification information 82. The card medium identification ID 80 is a storage area for storing address information to specify a communication target when the non-contact IC card 3 communicates with the card reader. The communication status 81 is a storage area for storing one status value from a status list 9 shown in FIG. 17. The individual identification information 82 is a storage area for storing the individual information retrieved from the non-contact IC card 3.

Operation of the First Embodiment

An operation of the first embodiment will be explained next. The host PC 1 sends the authentication printing data 4 through a network, and the printing data receiving unit 20 in the printer 2 receives the authentication printing data 4. The printing data receiving unit 20 in the printer 2 sequentially sends the authentication printing data 4 to the job control unit 21.

Figure 7:
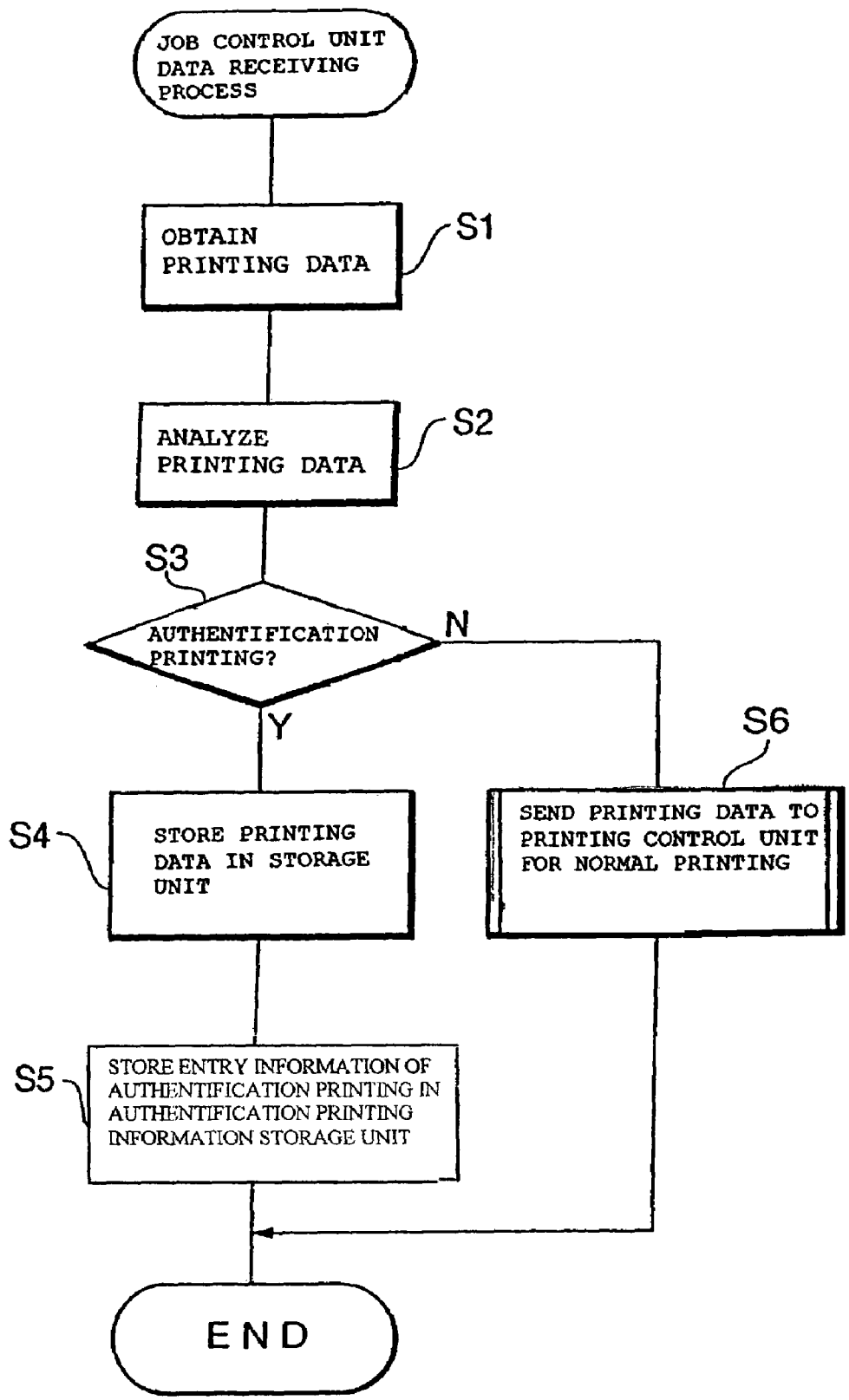
FIG. 7 is a flow chart showing an operational process of a job control unit in receiving data according to the first embodiment of the present invention.

FIG. 7 is a flow chart showing an operational process of the job control unit 21 in receiving the authentication printing data 4 or the normal printing data 43. When the job control unit 21 receives the authentication printing data 4 or the normal printing data 43 (step S1), the job control unit 21 compares the authentication printing data 4 or the normal printing data 43 with the format of the authentication printing data 4 shown in FIG. 3 for analysis (step S2). The job control unit 21 determines that a specific text for specifying the authentication printing exists in the area of the authentication printing mode selection information 40 to determine that the printing data is the authentication printing (step S3).

In step S3, when it is determined that the printing data is the authentication printing (Yes), the process proceeds to step 4.

In step 4, the printing data 43 in the authentication printing data 4 is temporarily stored in the printing data storage unit 22. At the same time, the authentication printing information is produced in the authentication printing information storage memory 23 according to the format of the authentication printing information 5. In the authentication printing information, the job name 41 in the printing data and data stored in the individual identification information 42 are copied in the data areas of the job name 51 and the individual identification information 52.

Figure 6:
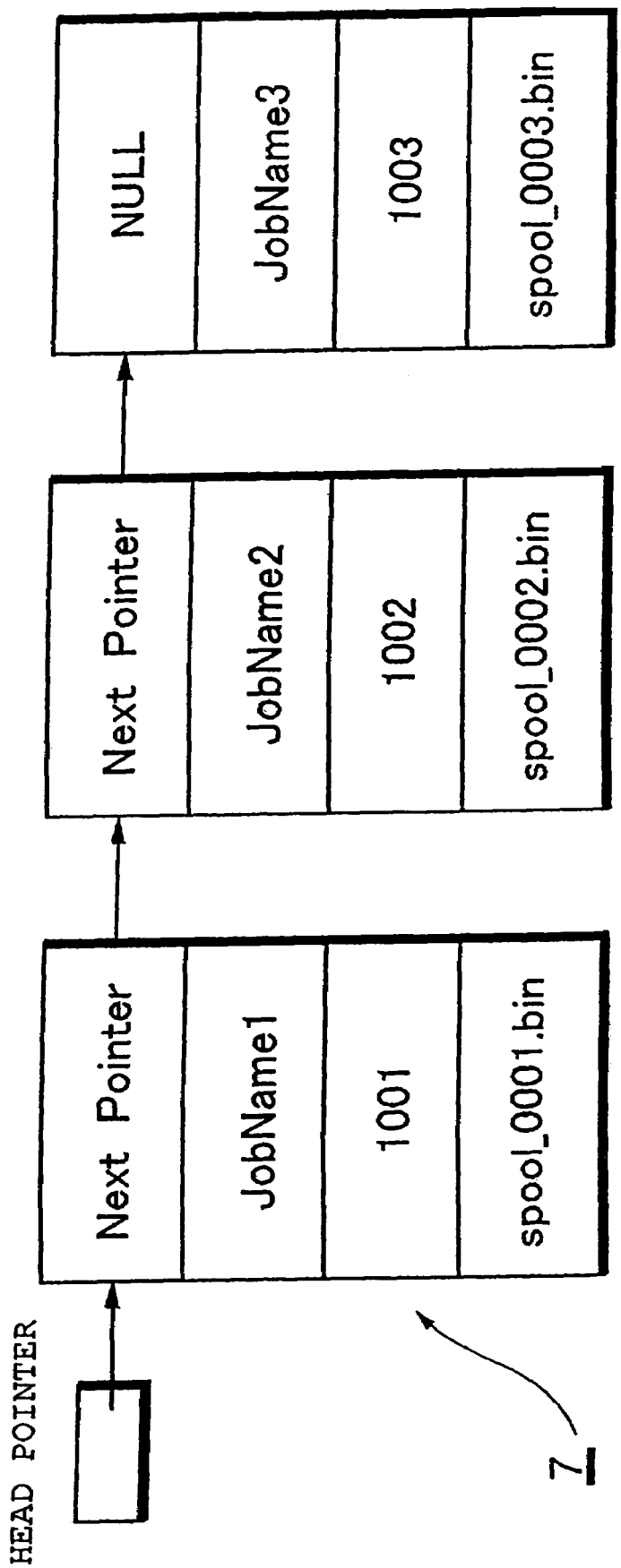
FIG. 6 is a schematic view showing an example of registered contents in an authentication printing information storage memory according to the first embodiment of the present invention.

A file name when the printing data 43 is stored in the printing data storage unit 22 is stored in the file name 53. The Next Pointer 50 is a pointer for tracing next authentication printing information when a plurality of authentication printing information is registered in the authentication printing information storage memory 23. FIG. 6 is a schematic view showing an example in which three types of authentication printing information are registered in the authentication printing information storage memory 23. As shown in the figures, it is possible to trace each of the authentication printing information through the pointer. Accordingly, the authentication printing information sent from the host PC 1 is registered in the printing data storage unit 22 and the authentication printing information storage memory 23 in the printer 2.

In step S3, when it is determined that the printing data is not the authentication printing (No), the process proceeds to step 6. In step 6, the printing data 43 is transferred to the printing control unit 26 for the normal printing.

When the user wants to send the printing data as the authentication printing, the user specifies that the printing data 43 to be printed is the authentication printing and inputs a job name for specifying the authentication printing data through the authentication printing selection unit 11 in the driver 10. When the user starts the printing through an application running on the host PC 1, the driver 10 notices and generates the printing data 43 according to the format of the authentication printing data 4. At this time, a specific text (for example, @COMMAND SET SECURITYPRINT=ENABLE) for specifying the authentication printing is stored in the authentication printing mode selection information 40. The job name 41 stores the job name (for example, @COMMAND SET SECURITYPRINTJOBNAME='JobName1') input by the user through the authentication printing selection unit 11. The individual identification information 42 stores individual identification information (for example, @COMMAND SET SECURITYPRINTIDNO=1001) stored in the individual identification information storage memory 30. After the printing data 43 is generated according to the format of the authentication printing data 4, the driver 10 sends the printing data 43 to the printer 2 through the network.

When the user wants to perform the normal printing instead of the authentication printing, the user specifies that the printing data 43 to be printed is not the authentication printing (for example, @COMMAND SET SECURITYPRINT=DISABLE), or does not send a specifying command itself. When the user starts the printing through the application, the driver 10 generates and sends the printing data 43 to the printer 2 through the network. At this time, the driver 10 generates the printing data 43 without including the text in the authentication printing mode selection information 40 in the printing data 40.

Figure 8:
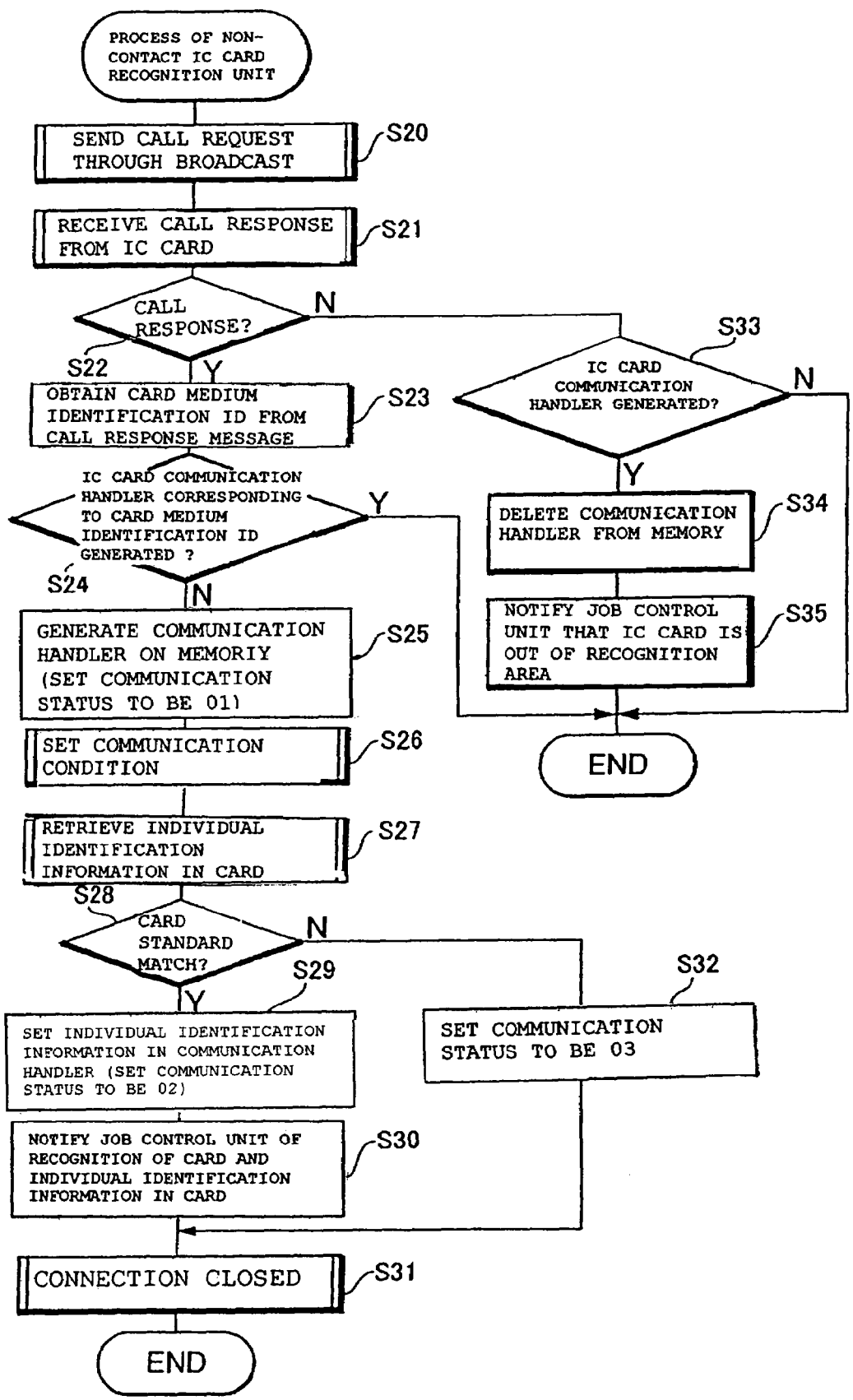
FIG. 8 is a flow chart showing an operational process of a non-contact IC card recognition unit according to the first embodiment of the present invention.
Figure 16:
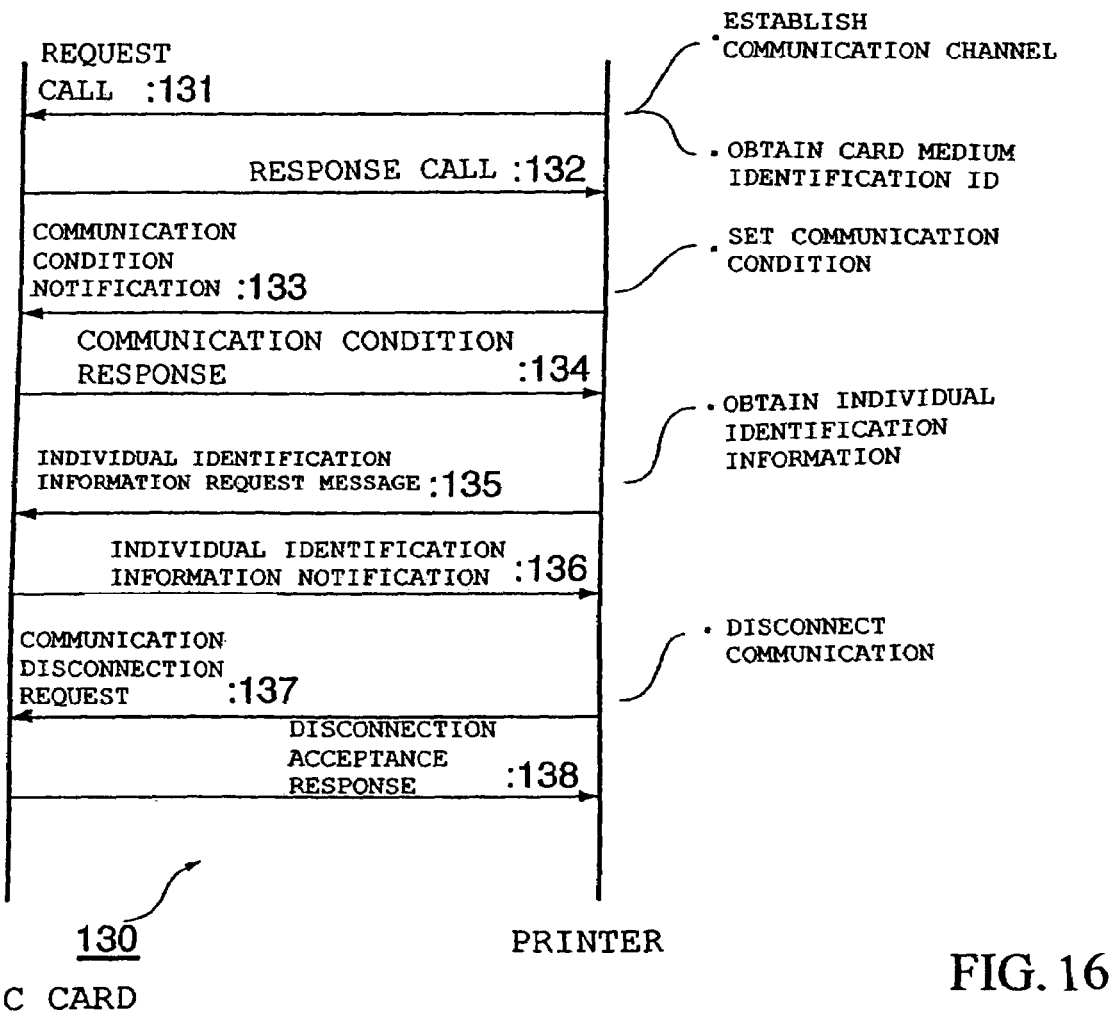
FIG. 16 is a schematic view showing an example of a communication message according to the first embodiment of the present invention.

FIG. 8 is a flow chart showing an operational process of the non-contact IC card recognition unit 24 for recognizing the non-contact IC card 3 when the non-contact IC card 3 is brought closer to the printer 2. FIG. 16 is a schematic view showing a sequence of a communication message.

The non-contact IC card recognition unit 24 repeats the operation routine shown in FIG. 8 with a specific time interval for recognizing the non-contact IC card 3. The non-contact IC card recognition unit 24 sends a communication message of a request call 131 (FIG. 16) through broadcast with a non-contact IC card reader unit therein (step S20). When the non-contact IC card 3 is located within a communication range (for example, 3 m) of the non-contact IC card recognition unit 24, the data communication unit 32 receives a communication message sent from the non-contact IC card recognition unit 24 through broadcast. The control unit 31 recognizes the communication message, and sends a communication message of the response call 132 through the communication unit 32. The response call 132 includes response call information of the card medium identification ID for specifying the non-contact IC card 3.

In step S21, the non-contact IC card recognition unit 24 receives the communication message of the response call 132. It is determined that there is the response call 132 (step S22). When there is the response call 132 (Yes), the process proceeds to step 23 in which the card medium identification ID in the response call 132 is retrieved from the response call information. It is determined that the IC card communication handler information corresponding to the card medium identification ID is already generated, that is, the card is already recognized (step S24). When the IC card communication handler information is not generated (No), in step S25, the IC card communication handler information is generated in the memory according to the format of the IC card communication handler information 8 shown in FIG. 15. At this time, the card medium identification ID is stored in the card medium identification ID 80 in the IC card communication handler information. The communication status 81 stores the status value 9 of '01: Card Recognized' shown in FIG. 17. The individual identification information 82 stores the number '0'.

In step S26, when the non-contact IC card recognition unit 24 sends a communication message of the communication condition notification 133, the non-contact IC card 3 receives the communication message. The non-contact IC card 3 selects a communication condition capable of communicating among the communication conditions sent, and sends the selected communication condition to the non-contact IC card recognition unit 24 with a communication message of the communication condition response 134. When the non-contact IC card recognition unit 24 receives the communication message of the communication condition response 134, the non-contact IC card recognition unit 24 recognizes the communication condition compatible with the non-contact IC card, and determines a communication method for the data communication thereafter (step S26).

In step S27, the non-contact IC card recognition unit 24 sends a communication message of the individual identification information request message 135 to the non-contact IC card 3 according to the communication method. Upon the request of the communication message, the control unit 31 of the non-contact IC card retrieves the card standard information 61 and the individual identification information 62 from the non-contact IC card individual identification information 6 shown in FIG. 5. Then, the control unit 31 sends the card standard information 61 and the individual identification information 62 to the non-contact IC card recognition unit 24 with the communication message of the individual identification information notification 136.

In step S28, the non-contact IC card recognition unit 24 receives the communication message of the individual identification information notification 136, and retrieves the card standard information and the individual identification information in the communication message. When it is determined (Yes) that the card standard information 61 is compatible with the printer (for example, a text of ABC Security Print Card; ABC indicating a name of a company), the individual identification information is stored in the data area of the individual identification information 82 in the IC card communication handler information in step S29. A communication status 81 '02: Individual Identification Information Obtained' shown in FIG. 16 is stored in the data area of the communication status 81.

In step S30, the non-contact IC card recognition unit 24 retrieves the individual identification information stored in the data area of the individual identification information 82 from the IC card communication handler information 170. Then, the non-contact IC card recognition unit 24 notifies the job control unit 21 that the non-contact IC card recognition unit 24 recognizes the IC card and adds the individual identification information to the communication message '01: Card Recognized' shown in FIG. 12.

In step S31, the non-contact IC card recognition unit 24 sends a communication message of the communication disconnection request 137 to the non-contact IC card 3. Upon receiving, the control unit 31 of the non-contact IC card 3 returns a communication message of the disconnection acceptance response 138, thereby completing the communication. Then, the non-contact IC card recognition unit 24 receives the communication message of the disconnection acceptance response 138, thereby completing the communication.

Figure 17:
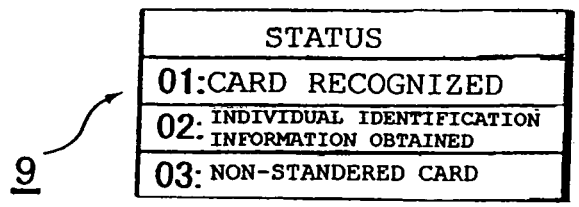
FIG. 17 is a schematic view showing a list of status of IC card communication handler information according to the first embodiment of the present invention.

When it is determined that the card standard information in the communication message of the individual identification information notification 136 is not compatible with the printer 2 in step S28 (No), the process proceeds to step S32, and a communication status '03: Card Incompatible' is stored in the data area of the communication status of the IC card communication handler information as shown in FIG. 17. Then, in step S31, the communication between the non-contact IC card recognition unit 24 and the non-contact IC card 3 is complete.

When the non-contact IC card recognition unit 24 recognizes the non-contact IC card for the first time, the process described above is performed. The process shown in FIG. 8 is repeated with a specific interval. When the non-contact IC card recognition unit 24 receives the communication message of the response call 132 from the non-contact IC card 3 of the same type in step S21, the non-contact IC card recognition unit 24 obtains the same card medium identification ID in step S23, so that the IC card communication handler information having the same card medium identification ID already exists. In this case, it is already known that the individual identification information is retrieved from the non-contact IC card, or the non-contact IC card is not compatible. Accordingly, the operation routine is complete according to the branch condition in step S24.

When the non-contact IC card moves away from the recognition range (within 3 m) of the non-contact IC card recognition unit 24, the operation proceeds as follows.

When it is tried to recognize the card through the broadcast transmission and there is no response, it is possible that the card previously recognized moves out of the area. In step S22 shown in FIG. 8, when the non-contact IC card recognition unit 24 does not receive the response call 132 (FIG. 16) from the non-contact IC card 3 (No), the process proceeds to step S33, and it is determined that the IC card communication handler is generated in the memory. When it is the case (Yes), in step S34, the IC card communication handler is deleted from the memory. In step 35, the job control unit 21 is notified that the non-contact IC card moves out of the recognition range through a message 100 '02: Card out of recognition range' shown in FIG. 12. Accordingly, it is possible to notify the job control unit 21 that the non-contact IC card 3 moves out of the recognition range or area.

Figure 9:
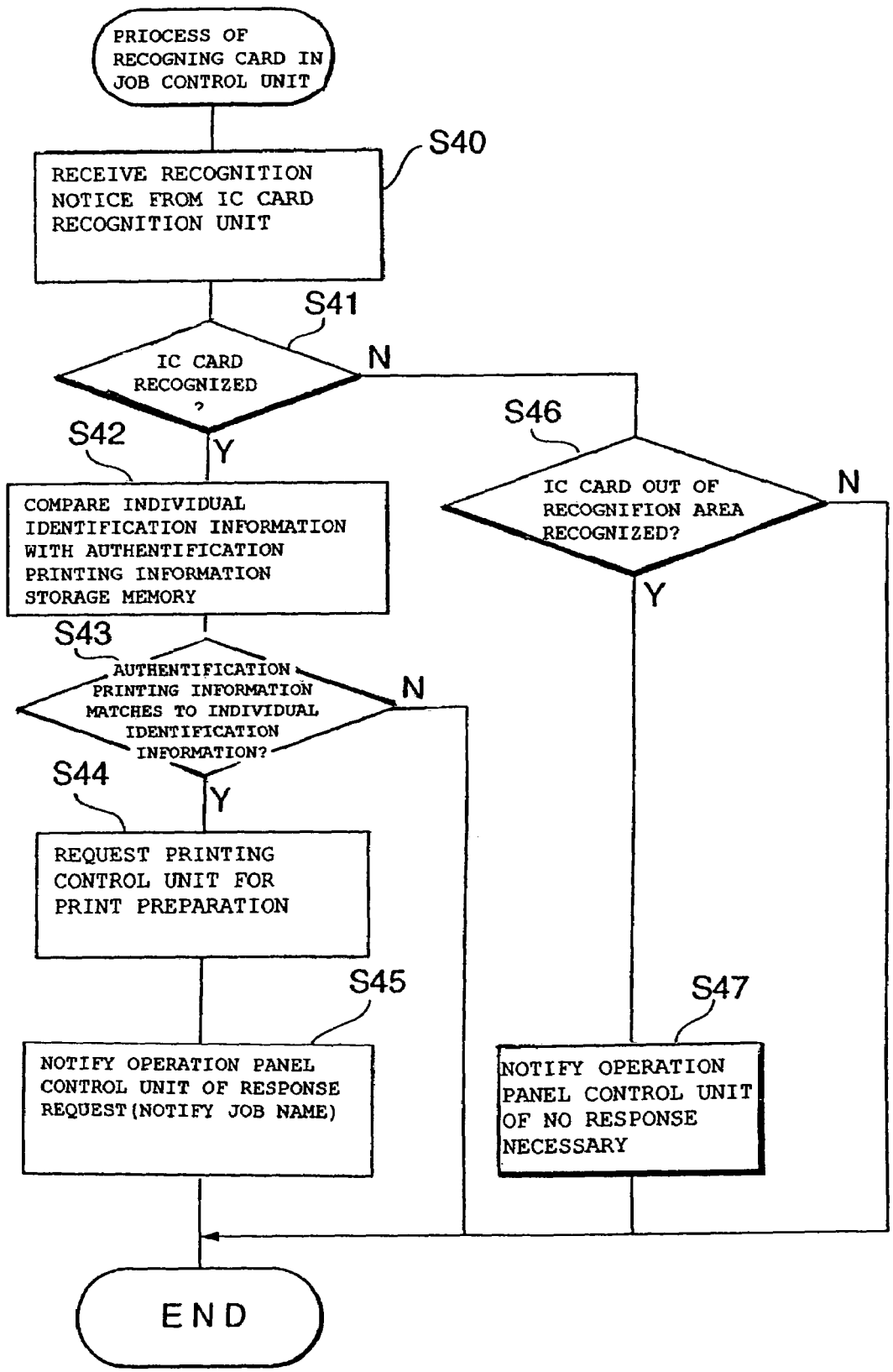
FIG. 9 is a flow chart showing an operational process of the job control unit in recognizing a card according to the first embodiment of the present invention.

FIG. 9 is a flow chart showing an operational process when the job control unit 21 receives an IC card recognition message shown in FIG. 12 from the non-contact IC card recognition unit 24.

In step S40, the job control unit 21 receives the IC card recognition message from the non-contact IC card recognition unit 24. In step S41, it is determined that the IC card is recognized. When it is the case (Yes), in step S42, the individual identification information attached to the IC card recognition message is retrieved. Then, it is determined that the individual identification information matches to individual identification information stored in the data area of the individual identification information 52 in a chain list (FIG. 6) of the authentication printing information stored in the authentication printing information storage memory 23. As a result of step S42, when there is no authentication printing information matching to the individual identification information (No), the operation routine is stopped.

When there is the authentication printing information matching to the individual identification information (Yes), the process proceeds to step S44, and the job control unit 21 requests the printing control unit 26 to start the print preparation. Upon receiving the request, the printing control unit 26 starts the warming up operation such as starting the print preparation unit in the printer 2 to heat up the fuser unit. In step S45, a message '01: Response request' shown in FIG. 13 requesting acceptance of the print start is notified to the operation panel control unit 25. At this time, the corresponding individual identification information and the job name are attached.

In step S41, when the non-contact IC card recognition unit 24 does not notify that the IC card is recognized (No), the process proceeds to step S46. When it is notified that the non-contact IC card moves out of the recognition range ('02: Card out of recognition range' shown in FIG. 12), the process proceeds to step S47, and a message '02: No response necessary' shown in FIG. 13 is notified to the operation panel control unit 25. At this time, the individual identification information and the job name are not attached to the message '02: No response necessary'. The message indicates that the operation panel control unit 25 does not need to respond to the message '01: Response request' notified in step S45.

Figure 10:
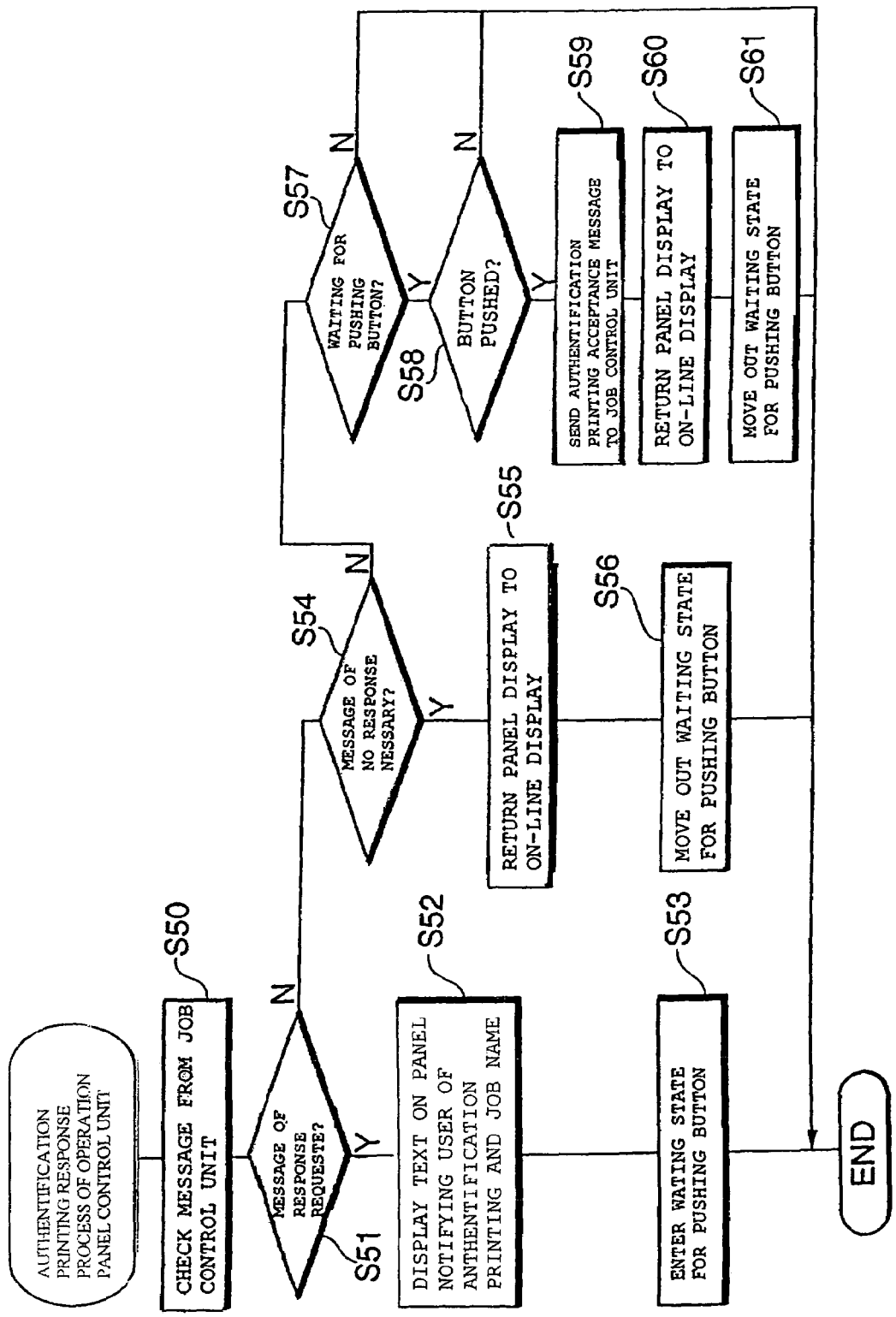
FIG. 10 is a flow chart showing an operational process of an operation panel according to the first embodiment of the present invention.

FIG. 10 is a flow chart showing an operational process executed by the operation panel control unit 25.

Figure 18:
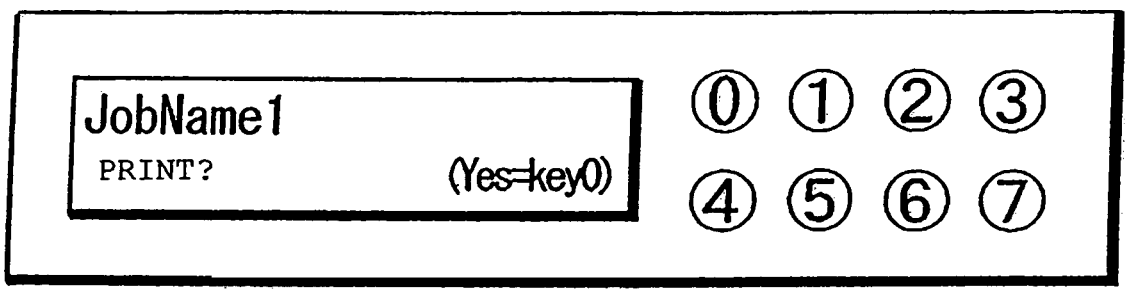
FIG. 18 is a schematic view showing a display example of the operation panel (authentication printing confirmation) according to the first embodiment of the present invention.

In step S50, the message notified from the operation panel control unit 25 is checked, and it is determined that the message is which one of the panel response request message 110 shown in FIG. 13. In step S51, when the message is '01: Response request' (Yes), the process proceeds to step S52. In step S52, the job name attached to the message of '01: Response request' is retrieved and displayed on the screen of the control panel. As shown in FIG. 18, a text prompting a permission of the authentication printing of the job name is also displayed on the screen. In step S53, the operation panel control unit 25 waits for pushing a button.

Figure 19:
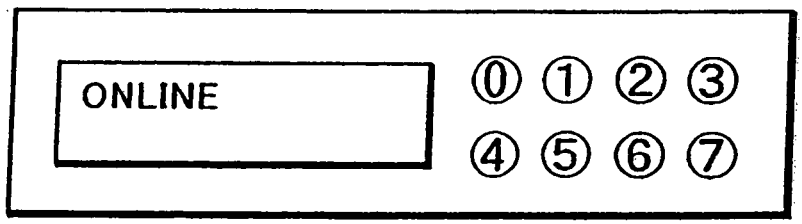
FIG. 19 is a schematic view showing a display example of the operation panel (on line display) according to the first embodiment of the present invention.

When the message notified from the operation panel control unit 25 in step S50 is '02: No response necessary', the process proceeds to step S55 through the determinations in steps S51 and S54. In step S55, the screen of the control panel returns to on-line display (displaying a state waiting for the normal printing). Accordingly, the text prompting a permission of the authentication printing displayed on the screen in step S52 returns to the on-line display (FIG. 19). In step S56, the state waiting for pushing a button is canceled. Accordingly, when the non-contact IC card 3 moves away from the card recognition area of the non-contact IC card recognition unit 24, it is possible to return the screen of the control panel to the normal on-line display.

When the message notified from the job control unit 21 is not received in step S50, the process proceeds to step S57 through the determinations in steps S51 and S54. In step S57, when the operation panel control unit 25 does not wait for pushing a button, the process is complete since there is nothing to do. When the operation panel control unit 25 waits for pushing a button, the process proceeds to step S58. In step S58, it is determined that the user pushes a specific button on the operation panel to start the authentication printing. When the specific button is not pushed (No), the process is complete. When the specific button is pushed (Yes), the process proceeds to step S59.

In step S59, the operation panel control unit 25 adds the individual identification information corresponding to the permitted authentication printing to a message 120 '01: Authentication permitted' shown in FIG. 14, and notifies the job control unit 21 of the message. In step S60, the screen of the control panel returns to the on-line display. In step S61, the state waiting for pushing a button is canceled. Accordingly, it is possible to notify the job control unit 21 that the user permits the authentication printing.

Figure 11:
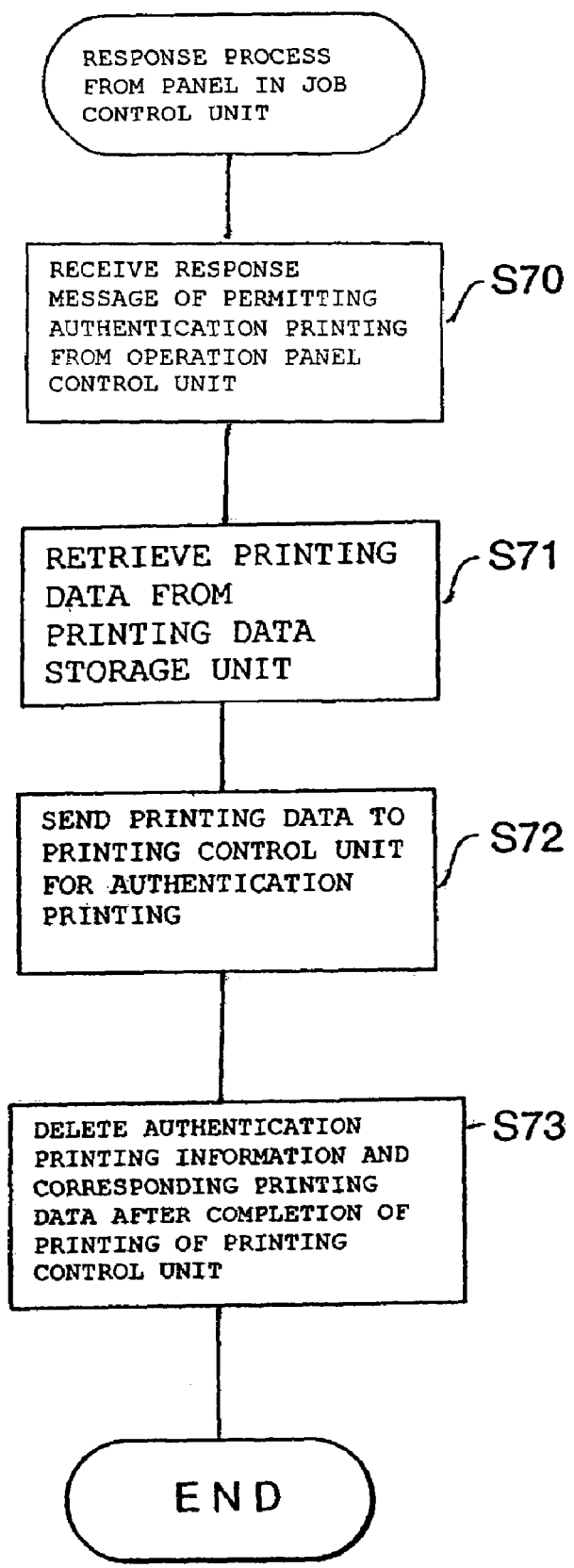
FIG. 11 is a flow chart showing an operational process of the job control unit in responding through a panel according to the first embodiment of the present invention.

FIG. 11 is a flow chart showing an operational process of the job control unit 21 when the message is notified from the operation panel control unit 25.

In step S70, when the response message of permitting the authentication printing ('01: Authentication permitted' shown in FIG. 14) is received from the operation panel control unit 25, the individual identification information attached to the message is retrieved. In step S71, the printing data of the authentication printing is retrieved from the printing data storage unit 22 according to the file name corresponding to the individual identification information. In step S72, the printing data is sent to the printing control unit 26. Accordingly, the printing control unit 26 analyzes the printing command in the printing data to form an image for printing, and the image is sent to the printing unit for the actual printing. After the printing, in step S73, the job control unit 21 deletes the corresponding file of the printing data from the printing data storage unit 22 and the corresponding authentication printing information from the authentication printing information storage memory 23.

Advantages of the First Embodiment

As described above, in the image forming device in the first embodiment of the present invention, it is not necessary to input a password like in a conventional device. It is possible to use the non-contact IC card to perform the authentication printing with the printer 2. It is also possible to notify the job control unit 21 that the IC card moves away from the recognition area.

Further, when the user with the card enters the communication area or range, the printer starts the warm-up. Accordingly, when the user completes the selection of the authentication printing, the printer is ready for printing immediately, thereby reducing loss time up to completion of the printing.

Second Embodiment

Figure 20A:
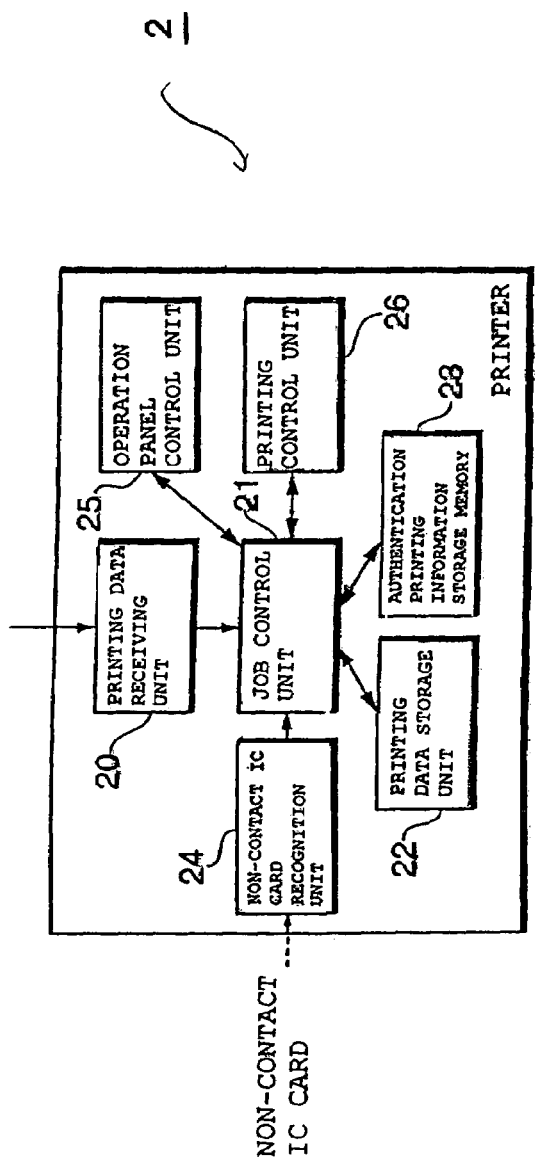
FIGS. 20(a) and 20(b) are block diagrams showing an image forming device according to a second embodiment of the present invention.
Figure 20B:
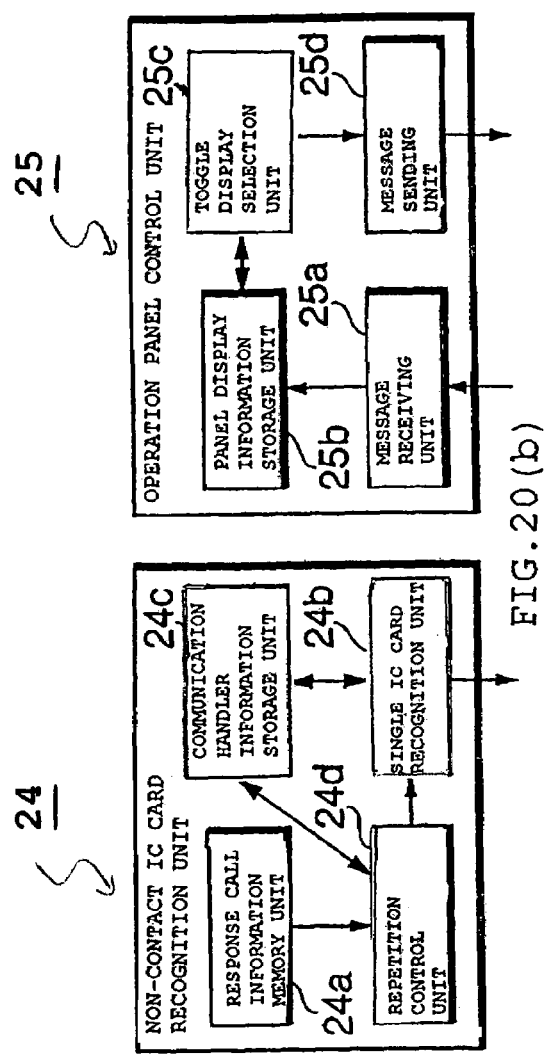

FIGS. 20(a) and 20(b) are block diagrams showing an image forming device according to a second embodiment of the present invention. Components same as those in the first embodiments are designated by the same reference numerals, and the explanation thereof is omitted.

In the printer 2, the non-contact IC card recognition unit 24 includes a response call information memory unit 24a; a single IC card recognition unit 24b; a communication handler information storage unit 24c; and a repetition control unit 24c. With the functions of the components, it is possible to simultaneously recognize a plurality of the non-contact IC card. The non-contact IC card recognition unit 24 sends the request call 131 to start the non-contact communication with the non-contact IC card 3. When a plurality of the non-contact IC cards returns communication messages of the response call 132, the response call information memory unit 24a is a storage area for storing all of the response call information.

The single IC card recognition unit 24b has the same function as that of the non-contact IC card recognition unit in the first embodiment, and recognizes one of the non-contact IC cards and performs the non-contact communication. The single IC card recognition unit 24b obtains the individual identification information from the non-contact IC card 3, and notifies the job control unit 21 that the non-contact IC card 3 is recognized. The communication handler information storage unit 24c is a storage area for storing the IC card communication handler information generated when the single IC card recognition unit 24b communicates with the non-contact IC card 3. The repetition control unit 24d repeats the single IC card recognition unit 24b according to the response call information stored in the response call information memory unit 24a when a plurality of the non-contact IC cards is recognized, thereby controlling the communication with a plurality of the non-contact IC cards 3.

The operation panel control unit 25 includes a message receiving unit 25a; a panel display information storage unit 25b; the toggle display selection unit 25c; and a message sending unit 25d. With the functions of the components, it is possible to perform a toggle display (alternate display) of a plurality of authentication printing start confirmation messages (see FIG. 30). The message receiving unit 25a receives a panel response request message (see FIG. 25) sent from the job control unit 21. In the second embodiment, the non-contact IC card recognition unit 24 recognizes a plurality of the non-contact IC cards simultaneously. Accordingly, the message receiving unit 25a receives a plurality of the messages '01: Response request' with different individual identification information simultaneously.

The panel display information storage unit 25b is a storage area for temporarily storing a panel response request message received by the message receiving unit 25a to perform the toggle display on the screen of the operation panel. The toggle display selection unit 25c controls to perform the toggle display of a plurality of authentication printing start confirmation messages on the screen of the operation panel. The toggle display selection unit 25c is provided with a toggle display selection pointer 191 (see FIG. 29) on a memory for selecting one of panel display information stored in the panel display information storage unit 25b. The message sending unit 25d sends a message (see FIG. 26) indicating that the start of the authentication printing is permitted to the job control unit 21.

Figure 27:
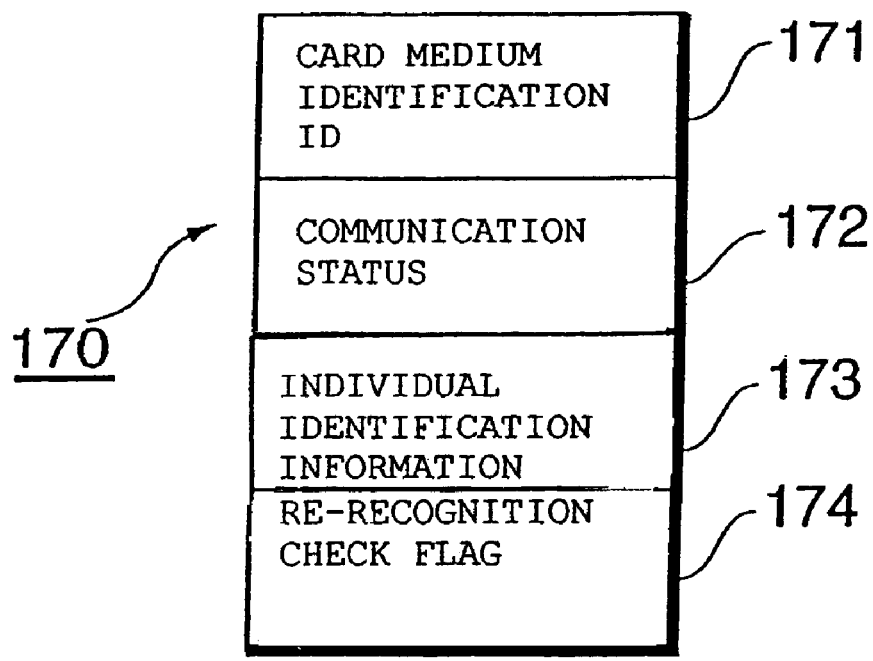
FIG. 27 is a schematic view showing a format of IC card communication handler information according to the first embodiment of the present invention.

FIG. 27 is a schematic view showing a format of IC card communication handler information 170 to be stored in the communication handler information storage unit 24c. The format of the IC card communication handler information 170 includes a card medium identification ID 171; a communication status 172; individual identification information 173; and a re-recognition check flag 174. As opposed to the format of the IC card communication handler information in the first embodiment (FIG. 15), the re-recognition check flag 174 is added. Each of the data area is used for a purpose same as that of the corresponding data area in the first embodiment, and the explanation thereof is omitted. The re-recognition check flag 174 is a storage area for storing a flag detecting that the non-contact IC card 3 temporarily recognized moves out of the recognition area of the non-contact IC card recognition unit 24.

Figure 28:
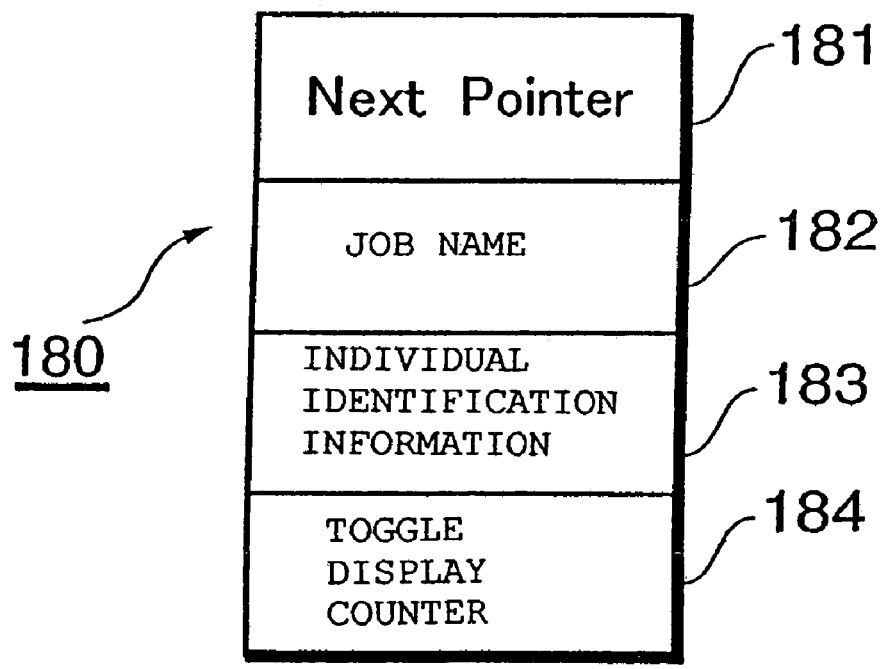
FIG. 28 is a schematic view showing a format of panel display information according to the second embodiment of the present invention.

FIG. 28 is a schematic view showing a format of panel display information 180 stored in the panel display information storage unit 25b. The format of the panel display information includes Next Pointer 181; a job name 182; individual identification information 183; and a toggle display counter 184. Next Pointer 181 is a pointer for tracing next panel display information when a plurality of panel information is registered in the panel display information storage unit 25b. The job name 182 and the individual identification information 183 are storage area for storing a job name and individual identification information in the panel response request message in FIG. 25 sent from the job control unit 21, respectively. The toggle display counter 184 is a storage area for storing a display time of the toggle display when displayed on the screen of the operation panel.

Figure 29:
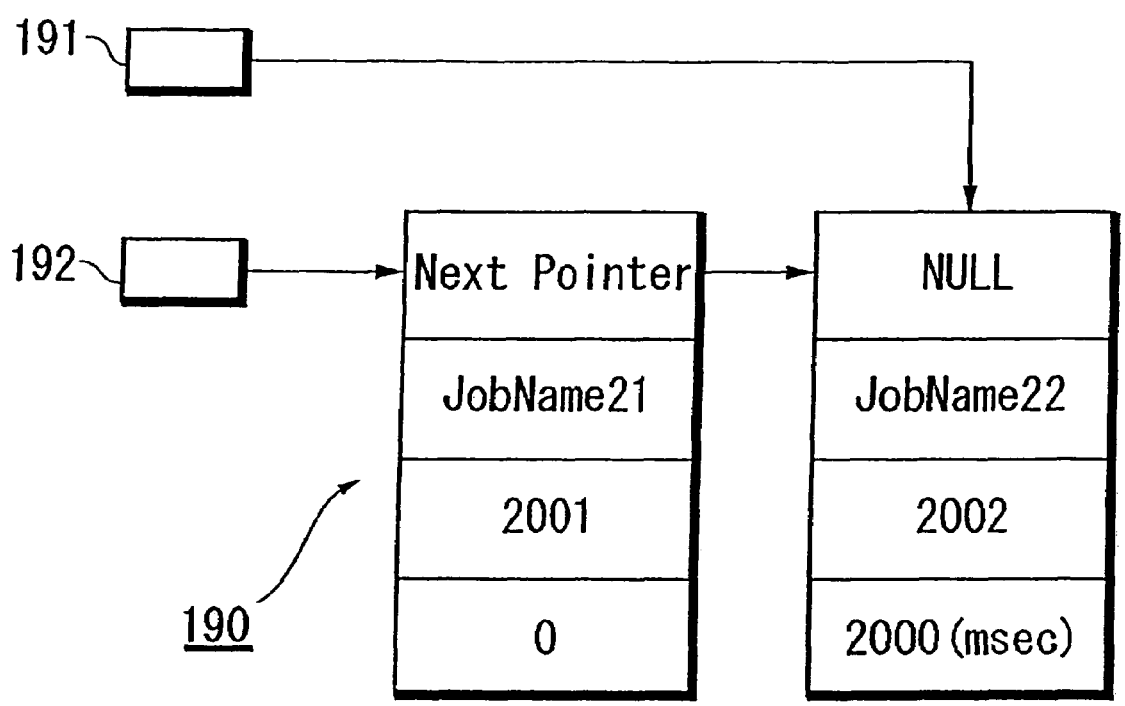
FIG. 29 is a schematic view showing an example of registered contents in an operation panel display information storage unit according to the unit embodiment of the present invention.

The panel display information storage unit 25b stores panel display information shown in FIG. 29, so that it is possible to access the panel display information sequentially registering the head pointer 192 in order. The toggle display selection pointer 191 stored in the toggle display selection unit 25c stores a pointer to the panel display information currently displayed on the screen on the operational panel.

Operation of the Second Embodiment

Figure 21:
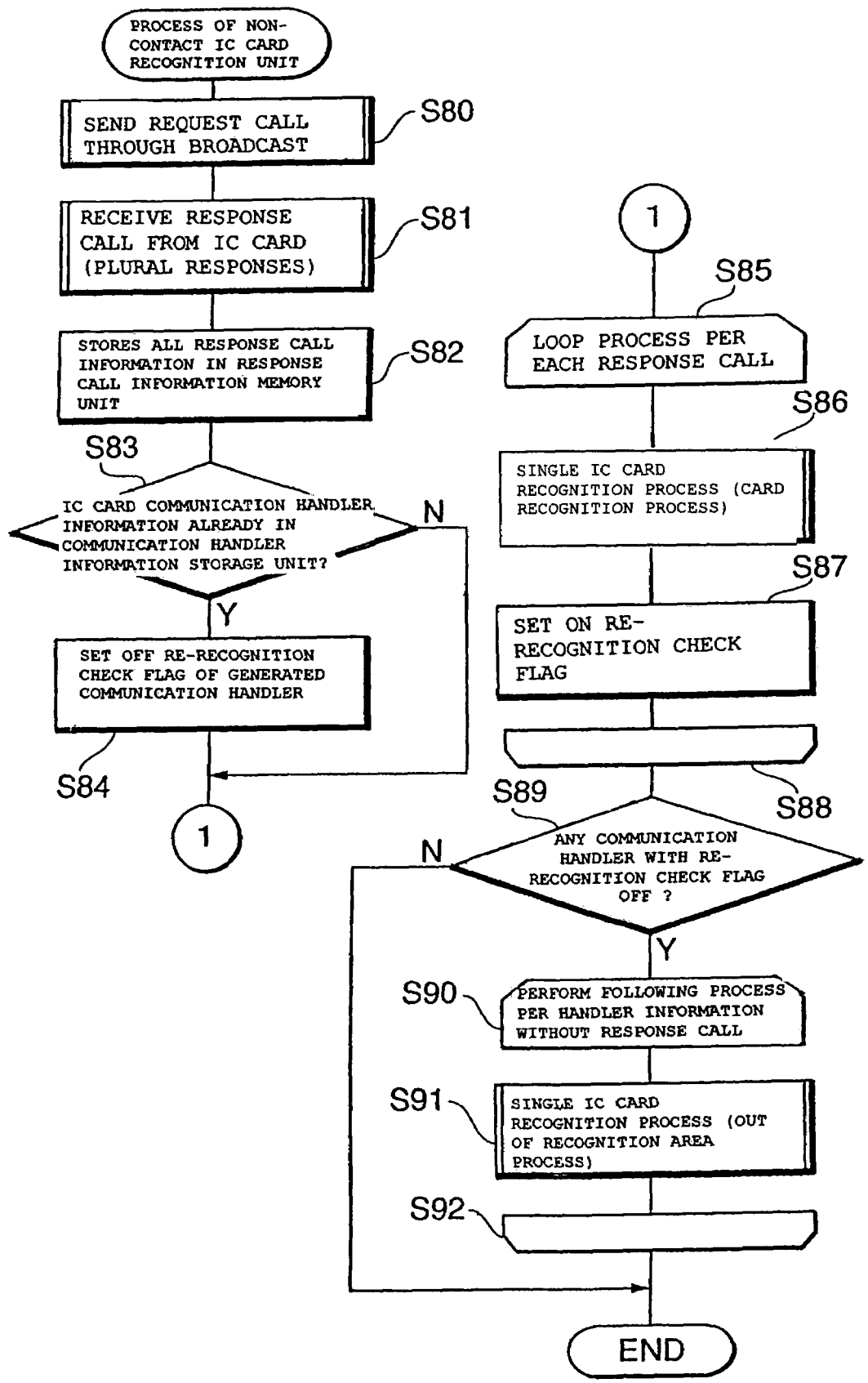
FIG. 21 is a flow chart showing an operational process of a non-contact IC card recognition unit according to the second embodiment of the present invention.
Figure 22:
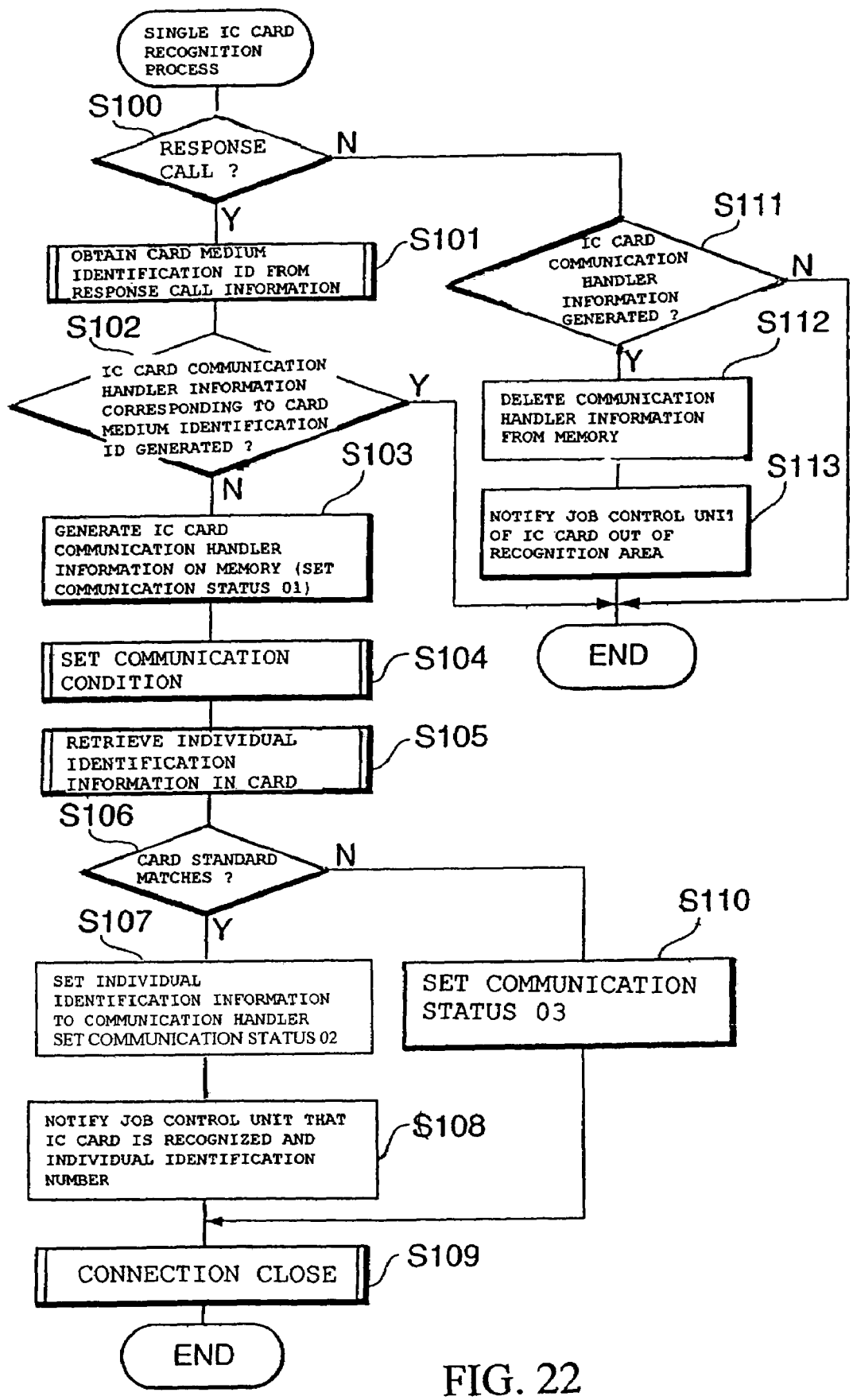
FIG. 22 is a flow chart showing an operational process of a single IC card recognition unit according to the second embodiment of the present invention.

An operation of the second embodiment will be explained next. Explanation of steps same as those in the first embodiment is omitted. FIG. 21 is a flow chart showing an operational process of the non-contact IC card recognition unit 24. FIG. 22 is a flow chart showing a single IC card recognition process of the single IC card recognition unit 24b. The operational process shown in FIG. 22 is called on from the operational process shown in FIG. 21.

As shown in FIG. 21, the non-contact IC card recognition unit 24 repeats an operational routine with a specific interval to recognize the non-contact IC card 3. In step S80, similar to the first embodiment, the non-contact IC card recognition unit 24 sends a communication message of a request call through broadcast with a non-contact IC card reader unit therein. The non-contact IC card 3 located within a communication range of the non-contact IC card recognition unit 24 attaches the card medium identification ID information to the communication message of the response call, and sends the communication message of the response call to the non-contact IC card recognition unit 24.

In step S81, the non-contact IC card recognition unit 24 receives the communication message of the response call within a specific period of time. In this case, when the non-contact IC card recognition unit 24 receives the communication messages of the response call from a plurality of the IC cards, the response call information memory unit 24a stores all of the messages in step S82. In step S83, when the communication handler information storage unit 24c stores the IC card communication handler information generated already, the process proceeds to step S84, so that the data area of the re-recognition check flag 174 is set to be off relative to all of the communication handler information.

Figure 24:
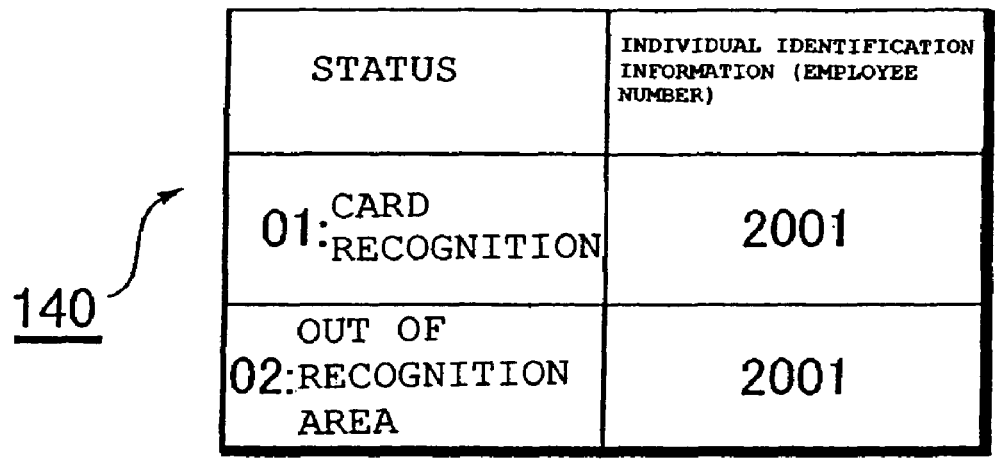
FIG. 24 is a schematic view showing an example of an IC card recognition message according to the second embodiment of the present invention.

In step S85, the repetition control unit 24d executes a loop process from step S85 to step S88 per each of the response call information stored in the response call information memory unit 24*a*. That is, in step S86, the single IC card recognition process is executed according to the process flow shown in FIG. 22 relative to the call response information picked up in step S85, so that the corresponding IC card communication handler information is generated in the memory of the communication handler information storage unit 24*c*. After the individual identification information in the non-contact IC card is retrieved, the message '01: Card Recognized' among the IC card recognition messages shown in FIG. 24 is notified to the job control unit 21. At this time, the individual identification information shown in FIG. 24 is added to the message, similar to the first embodiment.

In step S87, the data area of the re-recognition check flag 174 in the IC card communication handler information stored in the communication handler information storage unit 24*c* is set to be on. In step S88, the single IC card recognition process is executed relative to each response call. Through the series of the steps described above, a plurality of IC cards is recognized, and the results are notified to the job control unit 21.

In step S89, it is determined that there is one with the data area of the re-recognition check flag 174 off among the IC card communication handler information stored in the communication handler information storage unit 24*c*. When there is no such IC card communication handler information (No), the operation routine is complete. When there is one (Yes), the data area of the re-recognition check flag 174 is temporarily set to be off in step S84. In step S87, it is determined that the data area of the re-recognition check flag 174 is not set to be on. Accordingly, it is determined that the response call message of the corresponding IC card is not received in step S82, and the process proceeds to step S90. In step S90, the repetition control unit 24*c* starts controlling the process, and the single IC card recognition process is executed relative to each of the IC cards without the response call in step S91.

At this time, there is no communication message of the response call. Accordingly, the process proceeds to the routine of steps S100, S111, and S112 shown in FIG. 22. In step S112, the corresponding IC card communication handler information is deleted from the memory area of the communication handler information storage unit 24*c*. In step S113, a message '02: Out of recognition area' shown in FIG. 24 is sent to the job control unit 21 to notify that the corresponding non-contact IC card moves out of the recognition area. The individual identification information of the non-contact IC card shown in FIG. 24 is attached to the message.

Through the control described above, it is possible to recognize that which one of the non-contact IC cards is out of the recognition area in the job control unit 21. In step S92 shown in FIG. 21, the process is complete, and the step S91 is executed relative to all of the communication handlers without the response call to be received in step S90. Accordingly, it is possible to notify the job control unit 21 that a plurality of the non-contact IC cards is simultaneously out of the recognition area.

Figure 25:
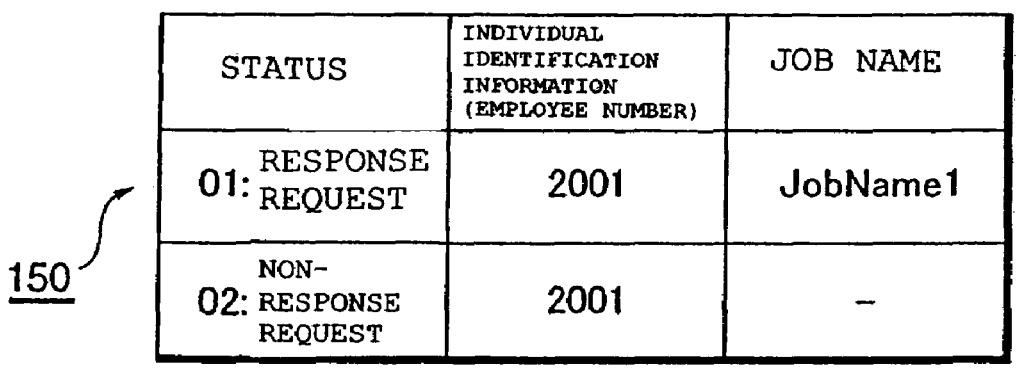
FIG. 25 is a schematic view showing an example of a panel response request message according to the second embodiment of the present invention.

An operation of the job control unit 21 when the non-contact IC card recognition unit 24 receives the IC card recognition message shown in FIG. 24 will be explained next. The operation of the job control unit 21 is similar to the operation shown in FIG. 8 in the first embodiment except that a panel response request message shown in FIG. 25 is sent to the operation panel control unit 25. Different from the panel response request message shown in FIG. 13, the individual identification information is attached when the message '02: No response necessary' is sent. Accordingly, the operation panel control unit 25 can determines that the panel response request message corresponds to the authentication printing having which of the individual identification information, in addition to the messages '01: Response request' and '02: No response necessary'.

Figure 23:
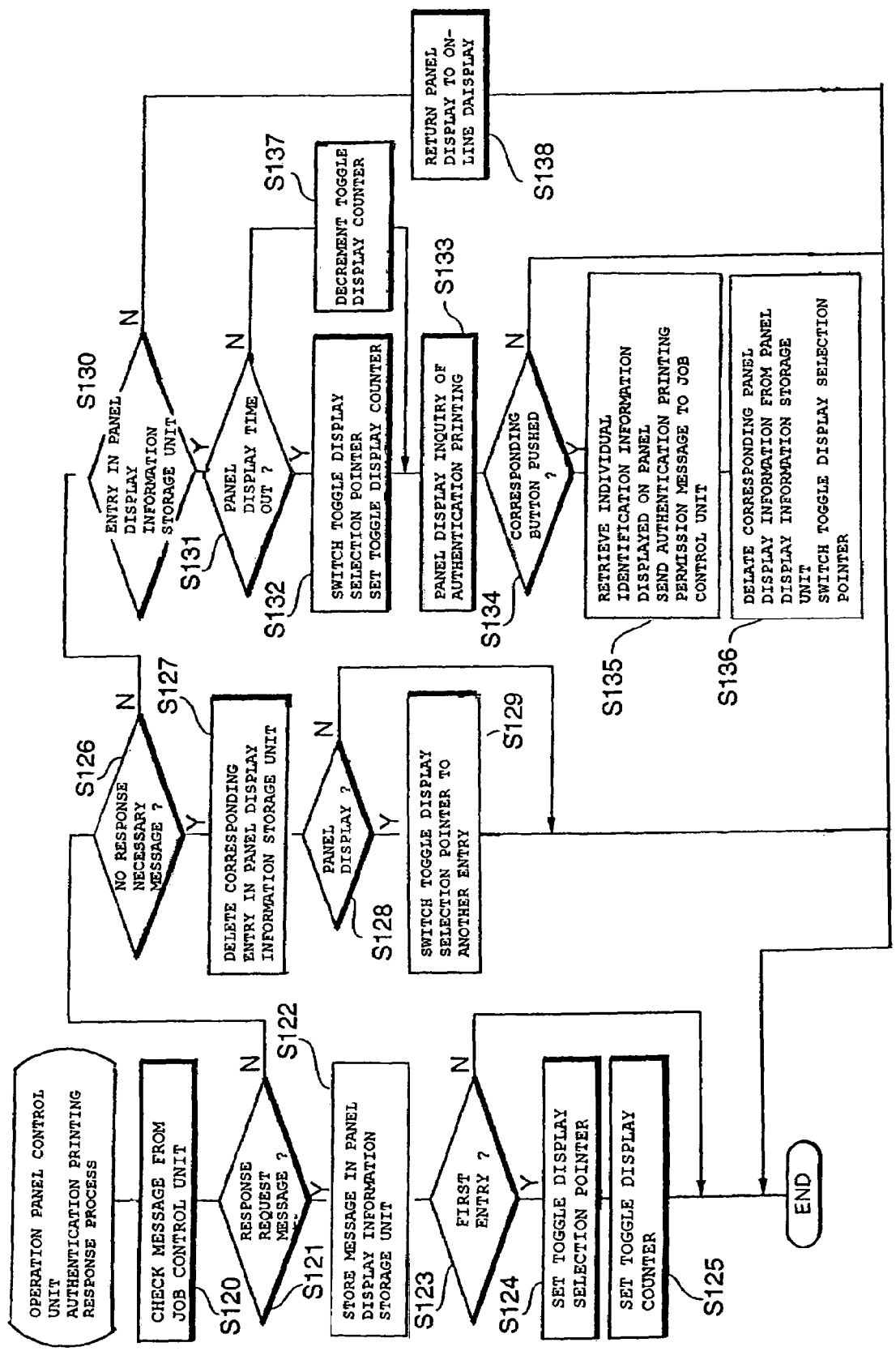
FIG. 23 is a flow chart showing an operational process of an operation panel according to the second embodiment of the present invention.

In step S120 shown in FIG. 23, the operation panel control unit 25 receives the panel response request message shown in FIG. 25 from the job control unit 21, and confirms the contents thereof. In step S121, it is determined that the message is the request call. When the message is '01: Response request' (Yes), panel display information is generated from the message according to the panel display information format 180 shown in FIG. 28 and stored in the panel display information storage unit 25*b* of the operation panel control unit 25. At this time, when the panel display information is already stored in the panel display information storage unit 25*b*, the pointer is connected to connect to Next Pointer shown in FIG. 28 for registration.

The job name and the individual identification information attached to the panel display information '01: Response request' received in step S120 are retrieved and stored in the data areas of the job name 182 and the individual identification information 183 in the panel display information, respectively. The data area of the toggle display counter temporarily stores '0'. In step S123, when the panel display information is not the first one stored in the panel display information storage unit 25*b* (No), the process is complete. When the panel display information is the first entry, a toggle display selection pointer stored in the toggle display selection unit 25*c* is set in step S124. In step S125, in the panel display information stored in the panel display information storage unit 25*b*, time for the toggle display is set in the storage area of the toggle display counter 184.

FIG. 29 is a schematic view showing an example of registered contents in the operation panel display information storage unit 25*c*. This is an example that the pointer of the toggle display selection pointer 191 is set in the panel display information when JobName22 is registered as the job name and 2002 is registered as the individual identification information in the panel display information. At this time, the value of the toggle display counter 184 is set at 2000 ms (two seconds). With the steps described above, according to the message '01: Response request' shown in FIG. 25 and sent from the job control unit 21, it is possible to register the entry of the authentication printing start confirmation message to be displayed on the screen of the panel in the panel display information storage unit 25*b*.

When the panel response request message received in step S120 is '02: No response necessary' shown in FIG. 25, the process proceeds to step S127 through the determinations in steps S121 and S126. In step S127, the individual identification information attached to the message '02: No response necessary' is compared with the data area of the individual identification information 1830 in the panel display information stored in the panel display information storage unit 25*b*. When there is matched panel display information, the panel display information is deleted from the panel display information storage unit 25*b*. In step S128, when the toggle display selection pointer 191 stored in the toggle display selection unit 25*c* indicates the deleted panel display information (Yes), the toggle display selection pointer is switched to indicate different panel display information stored in the panel display information storage unit 25*b* in step S129. When the different panel display information is not stored in the panel display information storage unit 25*b* (No), the toggle display selection pointer 191 is set to be NULL.

When the panel response request message is not received in step S120, the process proceeds to step S130 through the determinations in steps S121 and S126. When the panel display information is not registered in the panel display information storage unit 25b (No), it is not necessary to send the authentication printing start confirmation message. The process proceeds to step S138 in which the screen of the control panel returns to the on-line display, and the process is complete. When the panel display information is registered in the panel display information storage unit 25b (No) in step S130, the process proceeds to step S131. Then, when the value of the toggle display counter 184 in the panel display information indicated by the toggle display selection pointer 191 in the toggle display selection unit 25c is not 0, the process proceeds to step 137 in which the value of the toggle display counter 184 is reduced by a specific amount and stored again.

Figure 30:
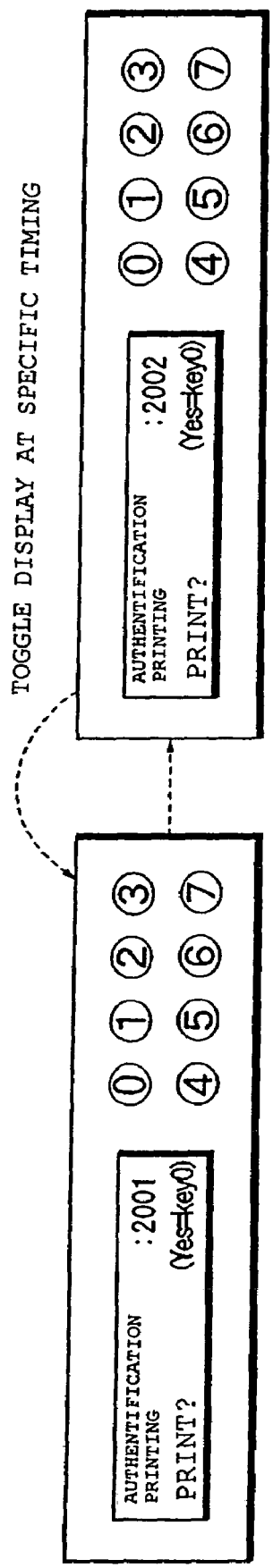
FIG. 30 is a schematic view showing a display example of the operation panel according to the second embodiment of the present invention.

When the value of the toggle display counter 184 is 0 in step S131, the process proceeds to step 132 in which the toggle display selection pointer 191 is switched to indicate different panel display information stored in the panel display information storage unit 25b. At this time, the pointer of Next Pointer is traced to switch to the next panel display information. When Next Pointer is NULL, the head pointer 192 is traced to switch to the first panel display information. When the panel display information storage unit 25b does not store the different panel display information, the switch is not executed. At this time, the toggle display counter 184 of the panel display information indicated by the toggle display selection pointer 191 stores a specific display time until the next toggle display switch. Accordingly, when the process flow shown in FIG. 23 is repeated with a constant interval, it is possible to sequentially switch the toggle display selection pointer 191 in the toggle display selection unit 25c to a plurality of the panel information with a specific interval as shown in FIG. 30.

In step S133, the individual identification information 183 in the panel display information indicated by the toggle display selection pointer 191 is retrieved, and the authentication printing start confirmation message such as an employee number relative to the individual identification information is displayed on the screen of the operation panel. Alternatively, the job name and the employee number are displayed simultaneously, and when the text exceeds the maximum lateral text length of the screen, they are displayed with scrolling (text sequentially moved).

In step S134, it is determined that the user pushes a specific button on the operation panel to start the authentication printing. When the user does not push the button, the process is complete. When the user pushes the button (Yes), the process proceeds to step S135 in which the individual identification information in the individual identification information 183 in the panel display information indicated by the toggle display selection pointer 191 is retrieved. The individual identification information is attached to the message 160 '01: Authentication permitted' shown in FIG. 26 and sent to the job control unit 21. In step S136, the panel display information indicated by the toggle display selection pointer 191 is deleted through the panel display information storage unit 25b, and the toggle display selection pointer 191 is switched to indicate next panel display information similar to step S132.

Accordingly, it is possible to send the authentication printing permission message to the job control unit 21 through the message sending unit 25d relative to the authentication printing displayed on the screen of the operation panel when the user pushes the specific button on the operation panel to start the authentication printing.

Figure 26:
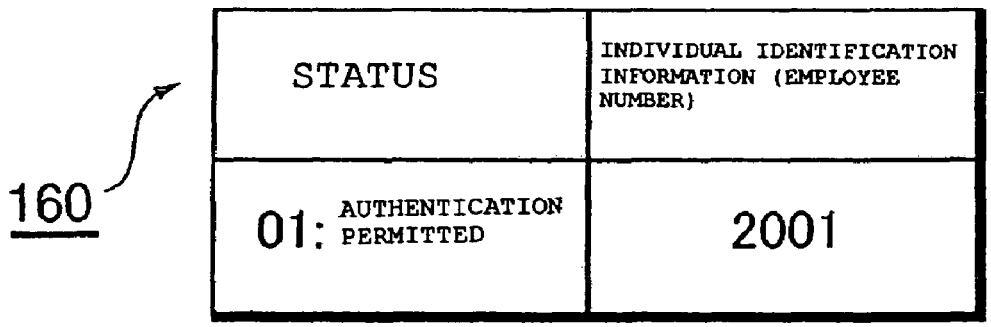
FIG. 26 is a schematic view showing an example of an authentication printing acceptance message according to the second embodiment of the present invention.

The job control unit 21 has the function same as that of the job control unit 21 in the first embodiment. Accordingly, when the authentication printing permission message 160 shown in FIG. 26 is received, the job control unit 21 executes the process through the operation routine similar to the one shown in FIG. 11. As a result, when the job control unit 21 receives the authentication printing permission message 160 shown in FIG. 26, the job control unit 21 retrieves the printing data of the authentication printing from the printing data storage unit 22 and sends the same to the printing control unit 26. Accordingly, the printing control unit 26 analyzes the printing data and forms an image, thereby completing the authentication printing.

Advantages of the Second Embodiment

As described above, when a plurality of users tries to approach and use the printer and a plurality of the IC cards is recognized simultaneously, a plurality of the authentication printing start confirmation messages is displayed on the screen of the operation panel. Accordingly, when one of the users pushes a specific button to start the authentication printing, it is possible to perform the authentication printing corresponding to the authentication printing start confirmation message displayed on the screen, thereby improving convenience.

The disclosure of Japanese Patent Application No. 2004-159021, filed on May 28, 2004, is incorporated in the application.

While the invention has been explained with reference to the specific embodiments of the invention, the explanation is illustrative and the invention is limited only by the appended claims.

What is claimed is:

1. An image forming device, comprising:
a data receiving unit for receiving printing data and first identification information through a network;
a data storage unit for storing the printing data and the first identification information such that the printing data correspond to the first identification information;
a non-contact medium information obtaining unit for sending a call request externally to determine whether a non-contact medium is located within a specific range from the image forming device, requesting the non-contact medium to send second identification information stored in a memory of the non-contact medium when the non-contact medium is located within the specific range and the non-contact medium information obtaining unit receives a response call from the non-contact medium in a state of waiting for the response call from the non-contact medium, and obtaining the second identification information stored in the memory of the non-contact medium;
a print control unit for controlling a printing process of forming an image according to the printing data;
an information comparison unit for comparing the first identification information stored in the data storage unit with the second identification information obtained by the non-contact medium information obtaining unit when the non-contact medium information obtaining unit receives the second identification information; and
a data control unit for retrieving the printing data corresponding to the first identification information from the data storage unit so that the printing data become printable when the information comparison unit determines that the first identification information matches to the second identification information.

2. An image forming device according to claim 1, further comprising an authentication determination unit for determining that the data receiving unit receives authentication printing data, said authentication determination unit stores the authentication printing data in the data storage unit when it is determined that the data receiving unit receives the authentication printing data.

3. An image forming device according to claim 1, wherein said data receiving unit receives an employee number as the first identification information, said non-contact medium information obtaining unit obtaining an employee number as the second identification information.

4. An image forming device according to claim 1, wherein said data storage unit stores the printing data and the first identification information separately.

5. An image forming device according to claim 1, wherein said non-contact medium information obtaining unit obtains the second identification information stored in a memory of a radio frequency identification (RFID) card as the non-contact medium.

6. An image forming device according to claim 1, wherein said noncontact medium information obtaining unit is adopted to send the call request with a specific interval.

7. An image forming device according to claim 1, wherein said non-contact medium information obtaining unit is adopted to send the call request through broadcast.

8. An image forming device according to claim 1, wherein said non-contact medium information obtaining unit is adopted to send the call request whether the non-contact medium is located within a range that the non-contact medium information obtaining unit is communicable with the non-contact medium.

9. An image forming device according to claim 1, further comprising an input unit for an operator to input an instruction, said data control unit being arranged to send the printing data corresponding to the first identification information that matches to the second identification information to the print control unit when a print instruction is input through the input unit.

10. An image forming device according to claim 1, further comprising a display unit for displaying information to an operator, said display unit being arranged to display information related to the printing data corresponding to the first identification information when the information comparison unit determines that the first identification information matches to the second identification information.

11. An image forming device according to claim 10, further comprising an input unit for an operator to input an instruction, said data control unit being arranged to send the printing data corresponding to the first identification information that matches to the second identification information to the print control unit when a print instruction is input through the input unit.

12. An image forming device, comprising:
a data receiving unit for receiving printing data and first identification information through a network;
a data storage unit for storing the printing data and the first identification information such that the printing data correspond to the first identification information;
a non-contact medium information obtaining unit for obtaining second identification information stored in a memory of a non-contact medium;
a print control unit for controlling a printing process of forming an image according to the printing data;
an information comparison unit for comparing the first identification information stored in the data storage unit with the second identification information obtained by the non-contact medium information obtaining unit; and
a data control unit for retrieving the printing data corresponding to the first identification information from the data storage unit so that the printing data become printable when the information comparison unit determines that the first identification information matches to the second identification information,
wherein said non-contact medium information obtaining unit includes a judging unit for judging that the second identification information just obtained is equivalent to the second identification information previously stored in the data storage unit when the non-contact medium information obtaining unit stores the second identification information just obtained in the data storage unit, said non-contact medium information obtaining unit storing the second identification information just obtained in the data storage unit as new second identification information when the judging unit judges that the second identification information just obtained is not equivalent to the second identification information previously stored in the data storage unit.

13. An image forming device according to claim 12, wherein said noncontact medium information obtaining unit notifies the data control unit that the non-contact medium information obtaining unit stores the second identification information just obtained in the data storage unit.

14. An image forming device, comprising:
a data receiving unit for receiving printing data and first identification information through a network;
a data storage unit for storing the printing data and the first identification information such that the printing data correspond to the first identification information;
a non-contact medium information obtaining unit for obtaining second identification information stored in a memory of a non-contact medium;
a print control unit for controlling a printing process of forming an image according to the printing data;
an information comparison unit for comparing the first identification information stored in the data storage unit with the second identification information obtained by the non-contact medium information obtaining unit;
a data control unit for retrieving the printing data corresponding to the first identification information from the data storage unit so that the printing data become printable when the information comparison unit determines that the first identification information matches to the second identification information;
an authentication determination unit for determining that the data receiving unit receives authentication printing data, said authentication determination unit stores the authentication printing data in the data storage unit when it is determined that the data receiving unit receives the authentication printing data; and
a display unit for displaying an authentication printing start confirmation message when the authentication determination unit requests the display unit to display the authentication printing start confirmation message, and an operation panel control unit having an input unit for requesting authentication printing to start.

15. An image forming device according to claim 14, wherein said data control unit controls the operation panel control unit to display the authentication printing start confirmation messages corresponding to a plurality of the second identification information when the non-contact medium information obtaining unit obtains the plurality of the second identification information, said operation panel control unit alternately displaying the authentication printing start confirmation messages upon receiving a request signal.

16. An image forming device, comprising:
- a data receiving unit for receiving printing data and first identification information through a network;
- a data storage unit for storing the printing data and the first identification information such that the printing data correspond to the first identification information;
- a non-contact medium information obtaining unit for sending a call request externally to determine whether a non-contact medium is located within a specific range from the image forming device, requesting the non-contact medium to send second identification information stored in a memory of the non-contact medium when the non-contact medium is located within the specific range and the non-contact medium information obtaining unit receives a response call from the non-contact medium in a state of waiting for the response call from the non-contact medium, and obtaining the second identification information stored in the memory of the non-contact medium;
- a print control unit for controlling a printing process of forming an image according to the printing data;
- a print preparation unit for performing a print preparation process upon receiving an operation signal from the print control unit;
- an information comparison unit for comparing the first identification information stored in the data storage unit with the second identification information obtained by the non-contact medium information obtaining unit when the non-contact medium information obtaining unit receives the second identification information; and
- a data control unit for sending a command signal to the print control unit to activate the print preparation unit so that the printing data become printable when the information comparison unit determines that the first identification information matches to the second identification information.

17. An image forming device according to claim 16, wherein said print preparation unit includes a warm-up operation unit for warming up a fuser unit.

18. An image forming device according to claim 16, wherein said non-contact medium information obtaining unit is adopted to send the call request with a specific interval.

19. An image forming device according to claim 16, wherein said non-contact medium information obtaining unit is adopted to send the call request through broadcast.

20. An image forming device according to claim 16, wherein said non-contact medium information obtaining unit is adopted to send the call request whether the non-contact medium is located within a range that the non-contact medium information obtaining unit is communicable with the non-contact medium.

* * * * *